US012309785B2

(12) United States Patent
Matsumura et al.

(10) Patent No.: US 12,309,785 B2
(45) Date of Patent: May 20, 2025

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/754,917

(22) PCT Filed: Oct. 8, 2020

(86) PCT No.: PCT/JP2020/038083
§ 371 (c)(1),
(2) Date: Apr. 15, 2022

(87) PCT Pub. No.: WO2021/075339
PCT Pub. Date: Apr. 22, 2021

(65) Prior Publication Data
US 2024/0137937 A1    Apr. 25, 2024

(30) Foreign Application Priority Data
Oct. 18, 2019 (JP) .................... 2019-191063

(51) Int. Cl.
| | |
|---|---|
| *H04W 72/21* | (2023.01) |
| *H04B 7/06* | (2006.01) |
| *H04W 16/28* | (2009.01) |
| *H04W 24/08* | (2009.01) |

(52) U.S. Cl.
CPC ........ *H04W 72/21* (2023.01); *H04B 7/06968* (2023.05); *H04W 16/28* (2013.01); *H04W 24/08* (2013.01)

(58) Field of Classification Search
CPC ..... H04W 72/21; H04W 16/28; H04W 24/08; H04B 7/06968
See application file for complete search history.

(56) References Cited

U.S. PATENT DOCUMENTS

| | | | |
|---|---|---|---|
| 2019/0253127 A1 | 8/2019 | Kang et al. | |
| 2020/0260300 A1* | 8/2020 | Cirik ................... | H04W 72/046 |
| 2020/0374960 A1* | 11/2020 | Deenoo ................ | H04W 76/19 |
| 2021/0320711 A1* | 10/2021 | Lee .................... | H04W 74/0833 |

(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

(Continued)

*Primary Examiner* — Chae S Lee
(74) *Attorney, Agent, or Firm* — Osha Bergman Watanabe & Burton LLP

(57) ABSTRACT

A terminal according to one aspect of the present disclosure includes a receiving section that receives a response to a report of a candidate beam for beam failure in a secondary cell, and a control section that, when a reference signal for quasi co-location (QCL) of a specific downlink resource is not applied to uplink transmission associated with the secondary cell and time from the response to the uplink transmission is longer than specific time, applies the candidate beam to the uplink transmission.

5 Claims, 7 Drawing Sheets

(56) References Cited

U.S. PATENT DOCUMENTS

2021/0352500 A1* 11/2021 Yang .................... H04L 41/0668
2022/0124860 A1*  4/2022 Guo ...................... H04W 72/20
2022/0386405 A1* 12/2022 Zhang ................... H04W 72/23

OTHER PUBLICATIONS

International Search Report issued in International Application No. PCT/JP2020/038083, mailed Nov. 24, 2020 (5 pages).
Written Opinion issued in International Application No. PCT/JP2020/038083; Dated Nov. 24, 2020 (3 pages).
Office Action issued in Indian Application No. 202217021938, mailed Sep. 26, 2024 (7 pages).
NTT DOCOMO, Inc.: "Discussion on multi-beam enhancement", 3GPP TSG RAN WG1 #98bis, R1-1911185; Chongqing, China, Oct. 14-20, 2019 (20 Pages).

* cited by examiner

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In existing LTE systems (LTE Rel. 8 to Rel. 14), monitoring of radio link quality (Radio Link Monitoring (RLM)) is performed. When Radio link failure (RLF) is detected in the RLM, a user terminal (User Equipment (UE)) is requested for RRC (Radio Resource Control) connection re-establishment.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (e.g., NR), performing procedure for switching to another beam in response to beam failure (BF) detection (which may be referred to as beam failure recovery (BFR) procedure, BFR, and so on) is under study. In the BFR procedure, when beam failure occurs, a UE reports a beam failure recovery request (BFRQ) for requesting recovery from the beam failure.

In the BFR procedure, the UE that reports notification of beam failure detection, information related to a cell in which the beam failure occurs, or information related to fresh candidate beams (also referred to as new candidate beams) by using one or more steps is also under study.

However, how the new candidate beams are applied has not been fully studied. Performing the BFR procedure inappropriately may cause reduced system performance, such as delay in BFR and the like.

Thus, an object of the present disclosure is to provide a terminal and a radio communication method that perform BFR procedure appropriately.

Solution to Problem

A terminal according to one aspect of the present disclosure includes a receiving section that receives a response to a report of a candidate beam for beam failure in a secondary cell, and a control section that, when a reference signal for quasi co-location (QCL) of a specific downlink resource is not applied to uplink transmission associated with the secondary cell and time from the response to the uplink transmission is longer than specific time, applies the candidate beam to the uplink transmission.

Advantageous Effects of Invention

According to one aspect of the present disclosure, it is possible to perform BFR procedure appropriately.

DESCRIPTION OF EMBODIMENTS (Transmit Power Control)

<Transmit Power Control for PUSCH>

Figure 1:
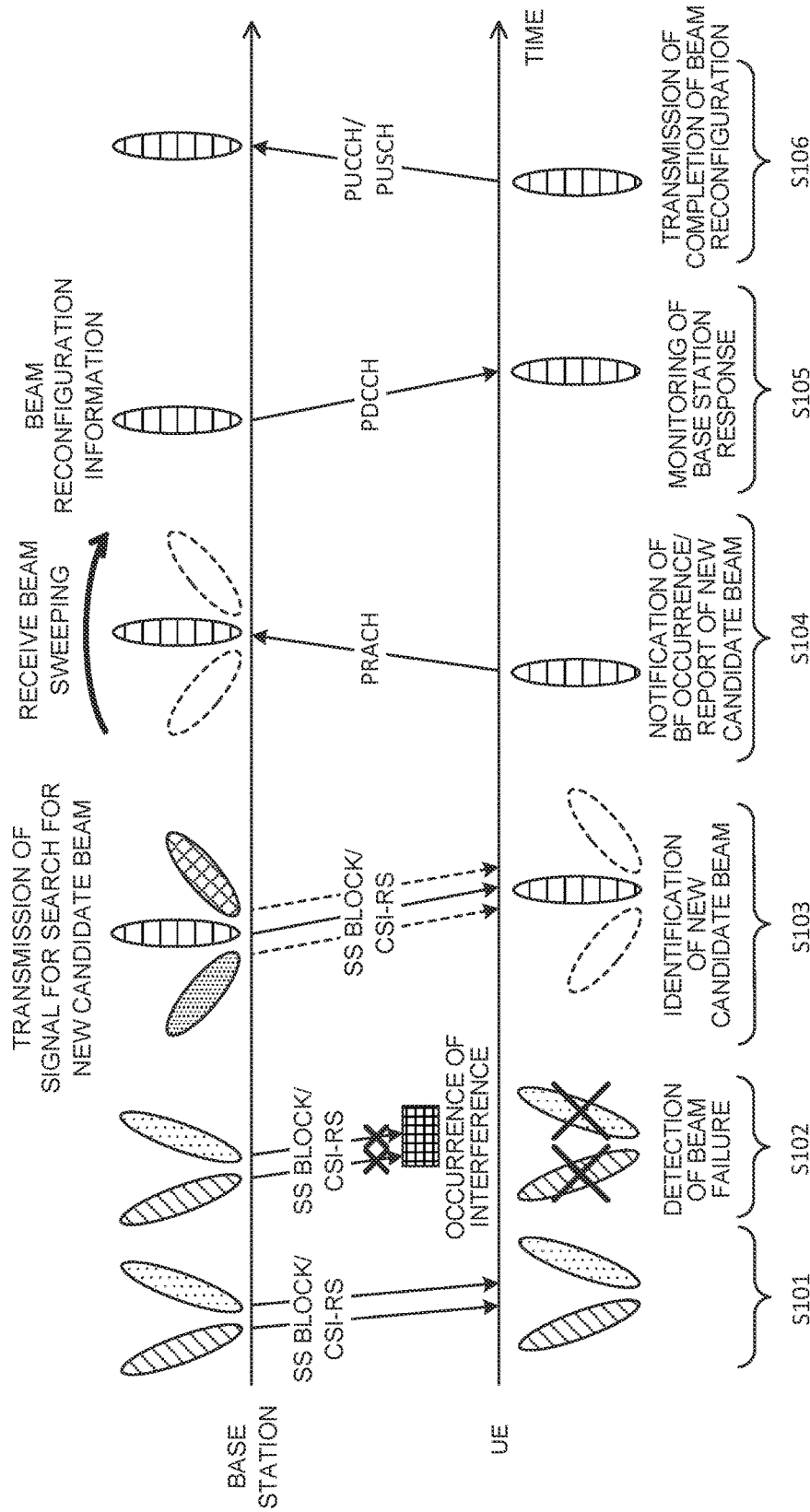
FIG. 1 is a diagram to show an example of BFR procedure in Rel. 15 NR.

In NR, transmit power for a PUSCH is controlled on the basis of a TPC command (also referred to as a value, an increasing/decreasing value, a correction value, and so on) indicated by a value of a given field (also referred to as a TPC command field and so on) in DCI.

For example, when a UE transmits the PUSCH on active UL BWP b for carrier f with serving cell c by using a parameter set (open-loop parameter set) having index j and index l for a power control adjustment state (PUSCH power control adjustment state), transmit power for the PUSCH ($P_{PUSCH,b,f,c}$ (i, j, $q_d$, l)) in PUSCH transmission occasion (also referred to as a transmission period and so on) i may be expressed by Equation (1) described below. The power control adjustment state may be referred to as a value based on the TPC command for power control adjustment state index l, a cumulative sum value of the TPC command, or a closed-loop value. l may be referred to as a closed-loop index.

PUSCH transmission occasion i is a period in which the PUSCH is transmitted, and may be constituted by, for example, one or more symbols, one or more slots, or the like.

[Math. 1]

$$P_{PUSCH,b,f,c}(i, j, q_d, l) = \min\begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{cases}$$ (Equation 1)

Here, $P_{CMAX,f,c}$ (i) is, for example, transmit power (also referred to as maximum transmit power, UE maximum output power, and so on) of a user terminal configured for carrier f with serving cell c in transmission occasion i. $P_{O\_PUSCH,b,f,c}$ (j) is, for example, a parameter related to target received power configured for active UL BWP b for carrier f with serving cell c in transmission occasion i (also referred to as, for example, a parameter related to transmit power offset, transmit power offset P0, a target received power parameter, and so on).

$M^{PUSCH}_{RB,b,f,c}$ (i) is, for example, the number of resource blocks (bandwidth) assigned to the PUSCH for transmission occasion i in active UL BWP b for carrier f with serving cell c and subcarrier spacing μ. $α_{b,f,c}$ (j) is a value provided by a higher layer parameter (also referred to as, for example, msg3-Alpha, p0-PUSCH-Alpha, a fractional factor, and so on).

$PL_{b,f,c}$ ($q_d$) is, for example, a path loss (path loss estimation [dB] or path loss compensation) calculated in the user terminal with use of index $q_d$ for a reference signal (RS, path loss reference RS, RS for path loss reference, DL-RS for path loss measurement, or PUSCH-PathlossReferenceRS) for a downlink BWP associated with active UL BWP b for carrier f with serving cell c.

When the path loss reference RS (e.g., PUSCH-PathlossReferenceRS) is not provided for the UE or when a dedicated higher layer parameter is not provided for the UE, the UE may calculate $PL_{b,f,c}$ ($q_d$) by using an RS resource from a synchronization signal (SS)/physical broadcast channel (PBCH) block (SS block (SSB)) used for obtaining a Master Information Block (MIB).

When RS resource indices the number of which is up to a value of a maximum number of path loss reference RSs (e.g., maxNrofPUSCH-PathlossReferenceRSs) are configured for the UE, and respective RS configuration sets for the RS resource indices are configured for the UE by the path loss reference RS, the set for the RS resource indices may include one or both of a set of SS/PBCH block indices and a set of channel state information (CSI)-reference signal (RS) resource indices. The UE may identify RS resource index $q_d$ in the set for the RS resource indices.

When PUSCH transmission is scheduled by a Random Access Response (RAR) UL grant, the UE may use the same RS resource index $q_d$ as that for corresponding PRACH transmission.

When a configuration of PUSCH power control by a sounding reference signal (SRS) resource indicator (SRI) (e.g., SRI-PUSCH-PowerControl) is provided for the UE, and one or more values of IDs for the path loss reference RS are provided for the UE, mapping between a set of values for an SRI field in DCI format 0_1 and a set of ID values for the path loss reference RS may be obtained from higher layer signaling (e.g., sri-PUSCH-PowerControl-Id in SRI-PUSCH-PowerControl). The UE may determine RS resource index $q_d$ on the basis of the path loss reference RS IDs mapped to SRI field values in DCI format 0_1 to schedule the PUSCH.

When PUSCH transmission is scheduled by DCI format 0_0, and PUCCH spatial relation information for a PUCCH resource having the lowest index to active UL BWP b for each carrier f and serving cell c is not provided for the UE, the UE may use the same RS resource index $q_d$ as that for PUCCH transmission in the PUCCH resource.

When PUSCH transmission is scheduled by DCI format 0_0, and a spatial setting for PUCCH transmission is not provided for the UE, when PUSCH transmission is scheduled by DCI format 0_1 not including the SRI field, or when the configuration of PUSCH power control by SRI is not provided for the UE, the UE may use RS resource index $q_d$ having a path loss reference RS ID with zero.

With respect to PUSCH transmission configured by a configured grant configuration (e.g., ConfiguredGrantConfig), when the configured grant configuration includes a given parameter (e.g., rrc-CofiguredUplinkGrant), RS resource index $q_d$ may be provided for the UE by a path loss reference index (e.g., pathlossReferenceIndex) in the given parameter.

With respect to the PUSCH transmission configured by the configured grant configuration, when the configured grant configuration does not include the given parameter, the UE may determine RS resource index $q_d$ on the basis of values of path loss reference RS IDs mapped to an SRI field in a DCI format to activate the PUSCH transmission. When the DCI format does not include the SRI field, the UE may determine RS resource index $q_3$ having the path loss reference RS ID with zero.

$Δ_{TF,b,f,c}$ (i) is a transmit power adjustment component (transmission power adjustment component) (offset or transmission format compensation) for UL BWP b for carrier f with serving cell c.

$f_{b,f,c}$ (i,l) is a PUSCH power control adjustment state for active UL BWP b for carrier f with serving cell c in transmission occasion i. For example, $f_{b,f,c}$ (i,l) may be expressed by Equation (2).

[Math. 2]

$$f_{b,f,c}(i, l) = f_{b,f,c}(i - i_0, l) + \sum_{m=0}^{C(D_i)-1} \delta_{PUSCH,b,f,c}(m, l) \qquad \text{(Equation 2)}$$

Here, $δ_{PUSCH,b,f,c}$ (i,l) may be a TPC command value included in DCI format 0_0 or DCI format 0_1 to schedule PUSCH transmission occasion i on active UL BWP b for carrier f with serving cell c or a TPC command value coded by being combined with another TPC command in DCI format 2_2 having a CRC scrambled by a specific RNTI (Radio Network Temporary Identifier) (e.g., TPC-PUSCH-RNTI).

$\sum_{m=0}^{C(Di)-1} δ_{PUCCH,b,f,c}$ (m,l) may be the sum of TPC command values in a set $D_i$ of TPC command values having cardinality C ($D_i$). $D_i$ may be a set of TPC command values received by the UE for PUSCH power control adjustment state l between a symbol $K_{PUSCH}$ (i–$i_0$)–1-symbols back from PUSCH transmission occasion i–$i_0$ and a symbol $K_{PUSCH}$ (i) symbols-back from PUSCH transmission occasion i on active UL BWP b for carrier f with serving cell c. $i_0$ may be the lowest positive integer that allows a symbol $K_{PUSCH}$ (i–$i_0$)-symbols back from PUSCH transmission occasion i–$i_0$ to be earlier than the symbol $K_{PUSCH}$ (i) symbols-back from PUSCH transmission occasion i.

When PUSCH transmission is scheduled by DCI format 0_0 or DCI format 0_1, $K_{PUSCH}$ (i) may be the number of symbols in active UL BWP b for carrier f with serving cell c after the last symbol of corresponding PDCCH reception and before the first symbol of the PUSCH transmission. When PUSCH transmission is configured by configured grant configuration information (ConfiguredGrantConfig), $K_{PUSCH}$ (i) may be the number of $K_{PUSCH,min}$ symbols equal to the product of the number of symbols per slot $N_{symb}^{slot}$ and a minimum value of a value provided by k2 in PUSCH-common configuration information (PUSCH-ConfigCommon) in active UL BWP b for carrier f with serving cell c.

Whether to have a plurality of states (e.g., two states) or whether to have a single state may be configured for the power control adjustment state by a higher layer parameter. When a plurality of power control adjustment states are configured, one of the plurality of the power control adjustment states may be identified by index l (e.g., l∈{0,1}).

Note that Equations (1) and (2) are just illustrative examples, and are not limited to these. It is only necessary that the user terminal controls transmit power for the PUSCH on the basis of at least one parameter illustrated in Equations (1) and (2), and additional parameters may be included, or some parameters may be omitted. In the above-described Equations (1) and (2), the transmit power for the PUSCH is controlled for each active UL BWP for a given carrier with a given serving cell, but the present disclosure is not limited to this. At least a part of the serving cell, carrier, BWP, and power control adjustment state may be omitted.

<Transmit Power Control for PUCCH>

In NR, transmit power for a PUCCH is controlled on the basis of a TPC command (also referred to as a value, an increasing/decreasing value, a correction value, an indication value, and so on) indicated by a value of a given field (also referred to as a TPC command field, a first field, and so on) in DCI.

For example, transmit power for the PUCCH ($P_{PUCCH,b,f,c}$ (i,$q_u$,$q_d$,l)) in PUCCH transmission occasion (also referred to as a transmission period and so on) i with respect to active UL BWP b for carrier f with serving cell c may be expressed by Equation (3) described below with use of index l for a power control adjustment state (PUCCH power control adjustment state). The power control adjustment state may be referred to as a value based on the TPC command for power control adjustment state index l, a cumulative sum value of the TPC command, or a closed-loop value. l may be referred to as a closed-loop index.

PUCCH transmission occasion i is a period in which the PUCCH is transmitted, and may be constituted by, for example, one or more symbols, one or more slots, or the like.

[Math. 3]

$$P_{PUCCH,b,f,c}(i, q_u, q_d, l) = \min\begin{Bmatrix} P_{CMAX,f,c}(i), \\ P_{O\_PUCCH,b,f,c}(q_u) + 10\log_{10}(2^{\mu} \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{Bmatrix}$$

(Equation 3)

Here, $P_{CMAX,f,c}$ (i) is, for example, transmit power (also referred to as maximum transmit power, UE maximum output power, and so on) of a user terminal configured for carrier f with serving cell c in transmission occasion i. $P_{O\_PUCCH,b,f,c}$ ($q_u$) is, for example, a parameter related to target received power configured for active UL BWP b for carrier f with serving cell c in transmission occasion i (also referred to as, for example, a parameter related to transmit power offset, transmit power offset P0, a target received power parameter, or the like).

$M^{PUCCH}_{RB,b,f,c}$ (i) is, for example, the number of resource blocks (bandwidth) assigned to the PUCCH for transmission occasion i in active UL BWP b for carrier f with serving cell c and subcarrier spacing μ. $PL_{b,f,c}$ ($q_d$) is, for example, a path loss (path loss estimation [dB] or path loss compensation) calculated in the user terminal with use of index $q_d$ for a reference signal (path loss reference RS, RS for path loss reference, DL-RS for path loss measurement, or PUCCH-PathlossReferenceRS) for a downlink BWP associated with active UL BWP b for carrier f with serving cell c.

When path loss reference RSs (pathlossReferenceRSs) are not provided for the UE or before a dedicated higher layer parameter is given to the UE, the UE calculates path loss $PL_{b,f,c}$ ($q_d$) by using an RS resource obtained from an SS/PBCH block used by the UE for obtaining an MIB.

When path loss reference RS information (pathlossReferenceRSs in PUCCH power control information (PUCCH-PowerControl)) is given to the UE, and PUCCH spatial relation information (PUCCH-SpatialRelationInfo) is not given to the UE, the UE obtains a value of a reference signal (referencesignal) in a path loss reference RS for the PUCCH from a path loss reference RS-ID for the PUCCH (PUCCH-PathlossReferenceRS-Id) having index 0 in path loss reference RS information for the PUCCH (PUCCH-PathlossReferenceRS). This reference signal resource exists on any one of the same serving cell or a serving cell indicated by a value of path loss reference linking information (pathlossReferenceLinking), if given. The path loss reference linking information indicates whether the UE applies DL for either of a special cell (SpCell) and a secondary cell (SCell) corresponding to this UL as path loss reference. The SpCell may be a primary cell (PCell) in a master cell group (MCG), or may be a primary secondary cell (PSCell) in a secondary cell group (SCG). The path loss reference RS information indicates a set of reference signals (e.g., CSI-RS configurations or SS/PBCH blocks) used for PUCCH path loss estimation.

$\Delta_{F\_PUCCH}$ (F) is a higher layer parameter given for each PUCCH format. $\Delta_{TF,b,f,c}$ (i) is a transmit power adjustment component (transmission power adjustment component) (offset) for UL BWP b for carrier f with serving cell c.

$g_{b,f,c}$ (i,l) is a value based on a TPC command for the above-described power control adjustment state index l for the active UL BWP for carrier f with serving cell c and transmission occasion i (e.g., a power control adjustment state, a cumulative sum value of the TPC command, a closed-loop value, or a PUCCH power adjustment state). For example, $g_{b,f,c}$ (i,l) may be expressed by Equation (4).

[Math. 4]

$$g_{b,f,c}(i, l) = g_{b,f,c}(i - i_0, l) + \sum_{m=0}^{C(C_i)-1} \delta_{PUCCH,b,f,c}(m, l)$$

(Equation 4)

Here, $\delta_{PUCCH,b,f,c}$ (i,l) is a TPC command value, and may be included in DCI format 1_0 or DCI format 1_1 detected by the UE in PUCCH transmission occasion i on active UL BWP b for carrier f with serving cell c, or may be coded by being combined with another TPC command in DCI format 2_2 having a CRC scrambled by a specific RNTI (Radio Network Temporary Identifier) (e.g., TPC-PUSCH-RNTI).

$\sum_{m=0}^{C(C_i)-1} \delta_{PUCCH,b,f,c}$ (m,l) may be the sum of TPC command values in a set $C_i$ of TPC command values having cardinality C ($C_i$). $C_i$ may be a set of TPC command values received by the UE for PUCCH power control adjustment state l between a symbol $K_{PUCCH}$ (i–$i_0$)–1-symbols back from PUCCH transmission occasion i–$i_0$ and a symbol $K_{PUCCH}$ (i) symbols-back from PUSCH transmission occasion i on active UL BWP b for carrier f with serving cell c. $i_0$ may be the lowest positive integer that allows a symbol $K_{PUCCH}$ (i–$i_0$)-symbols back from PUSCH transmission occasion i–$i_0$ to be earlier than the symbol $K_{PUCCH}$ (i) symbols-back from PUSCH transmission occasion i.

When PUCCH transmission depends on detection of DCI format 1_0 or DCI format 1_1 by the UE, $K_{PUCCH}$ (i) may be the number of symbols in active UL BWP b for carrier f with serving cell c after the last symbol of corresponding PDCCH reception and before the first symbol of the PUCCH transmission. When PUCCH transmission is configured by configured grant configuration information (ConfiguredGrantConfig), $K_{PUSCH}$ (i) may be the number of $K_{PUCCH,min}$ symbols equal to the product of the number of symbols per slot $N_{symb}^{slot}$ and a minimum value of a value provided by k2 in PUSCH-common configuration information (PUSCH-ConfigCommon) in active UL BWP b for carrier f with serving cell c.

When information (twoPUCCH-PC-AdjustmentStates) indicating use of two PUCCH power control adjustment states and PUCCH spatial relation information (PUCCH-SpatialRelationInfo) are provided for the UE, l={0,1}, and when the information indicating use of two PUCCH power control adjustment states or spatial relation information for the PUCCH is not provided for the UE, l may be equal to 0.

When the UE obtains TPC command values from DCI format 1_0 or DCI format 1_1 and when the PUCCH spatial relation information is provided for the UE, the UE may obtain mapping between a PUCCH spatial relation information ID (pucch-SpatialRelationInfoId) value and a closed loop index (closedLoopIndex or power adjustment state index l) by using an index provided by P0 ID for the PUCCH (p0-PUCCH-Id in p0-Set in PUCCH-PowerControl in PUCCH-Config). When the UE receives an activation command including a value of the PUCCH spatial relation information ID, the UE may determine a value of the closed loop index to provide a l value through linking to a corresponding P0 ID for the PUCCH.

When a configuration of a $P_{O\_PUCCH,b,f,c}$ ($q_u$) value for corresponding PUCCH power adjustment state l is provided by a higher layer for the UE for active UL BWP b for carrier f with serving cell c, $g_{b,f,c}$ (i,l)=0, and k=0, 1, . . . , i. When the PUCCH spatial relation information is provided for the UE, the UE may determine, on the basis of the PUCCH spatial relation information associated with P0 ID for the PUCCH corresponding to $q_u$ and a closed loop index value corresponding to l, the l value based on a value of $q_u$.

$q_u$ may be P0 ID for the PUCCH (p0-PUCCH-Id) indicating P0 for the PUCCH (P0-PUCCH) in P0 set for the PUCCH (p0-Set).

Note that Equations (3) and (4) are just illustrative examples, and are not limited to these. It is only necessary that the user terminal controls transmit power for the PUCCH on the basis of at least one parameter illustrated in Equations (3) and (4), and additional parameters may be included, or some parameters may be omitted. In the above-described Equations (3) and (4), the transmit power for the PUCCH is controlled for each active UL BWP for a given carrier with a given serving cell, but the present disclosure is not limited to this. At least a part of the serving cell, carrier, BWP, and power control adjustment state may be omitted.

<Transmit Power Control for SRS>

For example, transmit power for an SRS ($P_{SRS,b,f,c}$ (i,$q_s$,l)) in SRS transmission occasion (also referred to as a transmission period and so on) i with respect to active UL BWP b for carrier f with serving cell c may be expressed by Equation (5) described below with use of index l for a power control adjustment state. The power control adjustment state may be referred to as a value based on the TPC command for power control adjustment state index l, a cumulative sum value of the TPC command, or a closed-loop value. l may be referred to as a closed-loop index.

SRS transmission occasion i is a period in which the SRS is transmitted, and may be constituted by, for example, one or more symbols, one or more slots, or the like.

[Math. 5]

$$P_{SRS,b,f,c}(i, q_s, l) = \min \begin{cases} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{cases}$$ (Equation 5)

Here, $P_{CMAX,f,c}$ (i) is, for example, UE maximum output power for carrier f with serving cell c in SRS transmission occasion i. $P_{O\_SRS,b,f,c}$ ($q_s$) is a parameter related to target received power provided by p0 to active UL BWP b for carrier f with serving cell c and SRS resource set $q_s$(provided by SRS-ResourceSet and SRS-ResourceSetId) (also referred to as, for example, a parameter related to transmit power offset, transmit power offset P0, a target received power parameter, or the like).

$M_{SRS,b,f,c}$ (i) is an SRS bandwidth expressed by the number of resource blocks for SRS transmission occasion i on active UL BWP b for carrier f with serving cell c and subcarrier spacing µ.

$\alpha_{SRS,b,f,c}$ ($q_s$) is provided by $\alpha$ (e.g., alpha) for active UL BWP b for carrier f with serving cell c and subcarrier spacing µ and SRS resource set $q_s$.

$PL_{b,f,c}$ ($q_d$) is a DL path loss estimation value [dB] (path loss estimation [dB] or path loss compensation) calculated by the UE with use of RS resource index $q_d$ for an active DL BWP for serving cell c and SRS resource set $q_s$. RS resource index $q_d$ is a path loss reference RS (RS for path loss reference or DL-RS for path loss measurement, the RS being provided by, for example, pathlossReferenceRS) associated with SRS resource set $q_s$, and is an SS/PBCH block index (e.g., ssb-Index) or a CSI-RS resource index (e.g., csi-RS-Index).

When path loss reference RSs (pathlossReferenceRSs) are not provided for the UE or before a dedicated higher layer parameter is given to the UE, the UE calculates $PL_{b,f,c}$ ($q_d$) by using an RS resource obtained from an SS/PBCH block used by the UE for obtaining an MIB.

$h_{b,f,c}$ (i,l) is an SRS power control adjustment state for the active UL BWP for carrier f with serving cell c in SRS transmission occasion i. When a configuration of the SRS power control adjustment state (e.g., srs-PowerControlAdjustmentStates) indicates the same power control adjustment state for SRS transmission and PUSCH transmission, $h_{b,f,c}$ (i,l) is current PUSCH power control adjustment state $f_{b,f,c}$ (i,l). On the other hand, when the configuration of the SRS power control adjustment state indicates independent power control adjustment states for SRS transmission and PUSCH transmission, and a configuration of a cumulative TPC is not provided, SRS power control adjustment state $h_{b,f,c}$ (i) may be expressed by Equation (6).

[Math. 6]

$$h_{b,f,c}(i) = h_{b,f,c}(i-1) + \sum_{m=0}^{C(S_i)-1} \delta_{SRS,b,f,c}(m) \quad \text{(Equation 6)}$$

Here, $\delta_{SRS,b,f,c}$ (m) may be a TPC command value coded by being combined with another TPC command in a PDCCH having DCI (e.g., DCI format 2_3). $\sum_{m=0}^{C(S_i)-1} \delta_{SRS,b,f,c}$ (m) may be the sum of TPC commands in set $S_i$ of TPC command values having cardinality C ($S_i$) received by the UE between a symbol $K_{SRS}$ (i–$i_0$)–1-symbols back from SRS transmission occasion i–$i_0$ and a symbol $K_{SRS}$ (i) symbols-back from SRS transmission occasion i on active UL BWP b for carrier f with serving cell c and subcarrier spacing μ. Here, $i_0$ may be the lowest positive integer that allows the symbol $K_{SRS}$ (i–$i_0$)–1-symbols back from SRS transmission occasion i–$i_0$ to be earlier than the symbol $K_{SRS}$ (i) symbols-back from SRS transmission occasion i.

When SRS transmission is aperiodic, $K_{SRS}$ (i) may be the number of symbols in active UL BWP b for carrier f with serving cell c after the last symbol for a corresponding PDCCH to trigger the SRS transmission and before the first symbol for the SRS transmission. When SRS transmission is semi-persistent or periodic, $K_{SRS}$ (i) may be the number of $K_{SRS,min}$ symbols equal to the product of the number of symbols per slot $N_{symb}^{slot}$ and a minimum value of a value provided by k2 in PUSCH-common configuration information (PUSCH-ConfigCommon) in active UL BWP b for carrier f with serving cell c.

Note that Equations (5) and (6) are just illustrative examples, and are not limited to these. It is only necessary that the user terminal controls transmit power for the SRS on the basis of at least one parameter illustrated in Equations (5) and (6), and additional parameters may be included, or some parameters may be omitted. In the above-described Equations (5) and (6), the transmit power for the SRS is controlled for each BWP for a given carrier with a given cell, but the present disclosure is not limited to this. At least a part of the cell, carrier, BWP, and power control adjustment state may be omitted.

(TCI, Spatial Relation, QCL)

For NR, controlling a reception process (e.g., at least one of reception, demapping, demodulation, and decoding) and a transmission process (e.g., at least one of transmission, mapping, precoding, modulation, and coding) for at least one of a signal and a channel (represented as a signal/channel) in the UE on the basis of a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, and so on. The TCI state may be configured for the UE for each channel or for each signal.

QCL is an indicator indicating statistical properties of the signal/channel. For example, when a given signal/channel and another signal/channel are in a relationship of QCL, it may be indicated that it is assumable that at least one of a Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread,
QCL type B (QCL-B): Doppler shift and Doppler spread,
QCL type C (QCL-C): Doppler shift and average delay, and
QCL type D (QCL-D): spatial reception parameter.

A case that the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (e.g., another RS). The TCI state may be configured (indicated) by higher layer signaling or physical layer signaling, or a combination of these.

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS having a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information ("QCL-Info"). The QCL information may include at least one of information related to the RS having a QCL relationship (RS relation information) and information indicating a QCL type (QCL type information). The RS relation information may include information such as an index of the RS (for example, an SSB index, or a non-zero power CSI-RS (NZP CSI-RS) resource ID (Identifier)), an index of a cell in which the RS is located, and an index of a Bandwidth Part (BWP) in which the RS is located.

In Rel. 15 NR, as the TCI state for at least one of the PDCCH and PDSCH, both of an RS of QCL type A and an RS of QCL type D or only the RS of QCL type A can be configured for the UE.

When the TRS is configured as the RS of QCL type A, the TRS is different from a demodulation reference signal (DMRS) for the PDCCH or PDSCH, and it is assumed that the same TRS is periodically transmitted for a long time. The UE can calculate average delay, delay spread, and the like by measuring the TRS.

The UE for which the TRS as the RS of QCL type A has been configured with respect to a TCI state for the DMRS for the PDCCH or PDSCH can assume that parameters of QCL type A (average delay, delay spread, and the like) for the DMRS for the PDCCH or PDSCH and the TRS are the same, and thus can calculate parameters of QCL type A (average delay, delay spread, and the like) for the DMRS for the PDCCH or PDSCH on the basis of a measurement result of the TRS. When performing a channel estimation of at least one of the PDCCH and PDSCH, the UE can perform the channel estimation with higher accuracy by using the measurement result of the TRS.

The UE for which the RS of QCL type D has been configured can determine a UE receive beam (spatial domain reception filter or UE spatial domain reception filter) by using the RS of QCL type D.

An RS of QCL type X with a TCI state may mean an RS being in a QCL type X relationship with a given channel/signal (DMRS), and this RS may be referred to as a QCL source of QCL type X with the TCI state.

<TCI State for PDCCH>

Information related to QCL between a PDCCH (or a DMRS antenna port related to the PDCCH) and a given RS may be referred to as a TCI state for the PDCCH and so on.

The UE may judge a TCI state for a UE-specific PDCCH (CORESET) on the basis of higher layer signaling. For example, one or a plurality (K pieces) of TCI states may be configured for the UE by RRC signaling for each CORESET.

One of the plurality of TCI states configured by the RRC signaling may be activated for the UE by a MAC CE for each CORESET. The MAC CE may be referred to as a TCI state indication MAC CE for a UE-specific PDCCH (TCI State Indication for UE-specific PDCCH MAC CE). The UE may perform monitoring of a CORESET on the basis of an active TCI state corresponding to the CORESET.

<TCI State for PDSCH>

Information related to QCL between a PDSCH (or a DMRS antenna port related to the PDSCH) and a given DL-RS may be referred to as a TCI state for the PDSCH and so on.

M (M≥1) pieces of TCI states for the PDSCH (M pieces of QCL information for the PDSCH) may be notified to (configured for) the UE by higher layer signaling. Note that the number of the TCI states M configured for the UE may be limited by at least one of a UE capability and a QCL type.

DCI used for scheduling of the PDSCH may include a given field (which may be referred to as, for example, a TCI field, a TCI state field, and so on) indicating a TCI state for the PDSCH. The DCI may be used for scheduling of a PDSCH in one cell, and may be referred to as, for example, DL DCI, DL assignment, DCI format 1_0, DCI format 1_1, and so on.

Whether the TCI field is included in the DCI may be controlled by information notified to the UE from a base station. The information may be information (e.g., TCI presence information, information of TCI presence in DCI, or a higher layer parameter TCI-PresentInDCI) indicating whether the TCI field is present or absent in the DCI. For example, the information may be configured for the UE by higher layer signaling.

When more than 8 kinds of TCI states are configured for the UE, 8 or less kinds of TCI states may be activated (or designated) with use of a MAC CE. The MAC CE may be referred to as a TCI state activation/deactivation MAC CE for a UE-specific PDSCH (TCI States Activation/Deactivation for UE-specific PDSCH MAC CE). A value of the TCI field in the DCI may indicate one of the TCI states activated by the MAC CE.

When the TCI presence information set to "enabled" for a CORESET to schedule the PDSCH (CORESET used for PDCCH transmission to schedule the PDSCH) is configured for the UE, the UE may assume that the TCI field exists in DCI format 1_1 for a PDCCH transmitted on the CORESET.

In a case where the TCI presence information is not configured for a CORESET to schedule a PDSCH or the PDSCH is scheduled by DCI format 1_0, and where time offset between reception of DL DCI (DCI to schedule the PDSCH) and reception of a PDSCH corresponding to the DCI is equal to or greater than a threshold value, the UE may assume that a TCI state or QCL assumption for the PDSCH is, for determination of QCL of a PDSCH antenna port, identical to a TCI state or QCL assumption applied to a CORESET used for PDCCH transmission to schedule the PDSCH.

In a case where the TCI presence information is set to "enabled," and where a TCI field in DCI in a component carrier (CC) to schedule (a PDSCH) indicates an activated TCI state in a CC or DL BWP to be scheduled, and the PDSCH is scheduled by DCI format 1_1, the UE may use, for determination of QCL of the PDSCH antenna port, a TCI depending on a TCI field value in a detected PDCCH including the DCI. In a case where time offset between reception of DL DCI (to schedule the PDSCH) and a PDSCH corresponding to the DCI (PDSCH scheduled by the DCI) is equal to or greater than a threshold value, the UE may assume that a DM-RS port for a PDSCH of a serving cell is QCL with an RS in a TCI state related to a QCL type parameter given by an indicated TCI state.

When a single-slot PDSCH is configured for the UE, the indicated TCI state may be based on an activated TCI state in a slot with the scheduled PDSCH. When a multi-slot PDSCH is configured for the UE, the indicated TCI state may be based on an activated TCI state in the first slot with the scheduled PDSCH, and the UE may expect that the indicated TCI state is identical through slots with the scheduled PDSCH. In a case where a CORESET associated with a search space set for cross-carrier scheduling is configured for the UE, and where TCI presence information is set to "enabled" for the UE for the CORESET, and at least one of TCI states configured for a serving cell scheduled by the search space set includes QCL type D, the UE may assume that time offset between a detected PDCCH and a PDSCH corresponding to the PDCCH is equal to or greater than a threshold value.

In an RRC connected mode, in both of a case where information of TCI in DCI (higher layer parameter TCI-PresentInDCI) is set to "enabled" and a case where the information of TCI in DCI is not configured, when time offset between reception of DL DCI (DCI to schedule a PDSCH) and a corresponding PDSCH (PDSCH scheduled by the DCI) is less than a threshold value, the UE may assume that the DM-RS port for the PDSCH of the serving cell is QCL with an RS related to a QCL parameter used for PDCCH QCL indication of a CORESET having the lowest (minimum) CORESET-ID in the latest (most recent) slot in which one or more CORESETs in an active BWP for the serving cell are monitored by the UE, the CORESET being associated with a monitored search space. This RS may be referred to as a default TCI state for the PDSCH or a default QCL assumption for the PDSCH.

The time offset between reception of DL DCI and reception of a PDSCH corresponding to the DCI may be referred to as scheduling offset.

The above-described threshold value may be referred to as a time duration for QCL, "timeDurationForQCL," "Threshold," "Threshold for offset between a DCI indicating a TCI state and a PDSCH scheduled by the DCI," "Threshold-Sched-Offset," a schedule offset threshold value, a scheduling offset threshold value, and so on.

The time duration for QCL may be based on a UE capability, and may be based on, for example, a delay in PDCCH decoding and beam switching. The time duration for QCL may be a minimum time required for the UE to perform PDCCH reception and application of spatial QCL information received in DCI for PDSCH processing. The time duration for QCL may be represented by the number of symbols for each piece of subcarrier spacing, or may be represented by time (e.g., µs). Information about the time duration for QCL may be reported as UE capability information from the UE to the base station, or may be configured for the UE by using higher layer signaling from the base station.

For example, the UE may assume that a DMRS port for the above-described PDSCH is QCL with a DL-RS based on a TCI state activated with respect to a CORESET corresponding to the above-described lowest CORESET-ID. The latest slot may be, for example, a slot for receiving DCI to schedule the above-described PDSCH.

Note that the CORESET-ID may be an ID (ID for CORESET identification) configured by an RRC information element "ControlResourceSet."

In Rel. 16 (or later versions), in a case where a PDSCH and a PDCCH to schedule the PDSCH exist in different component carriers (CCs) (cross-carrier scheduling), when a PDCCH-to-PDSCH delay is shorter than the time duration for QCL or when a TCI state is absent in DCI for the scheduling, the UE may obtain a QCL assumption for the scheduled PDSCH based on an active TCI state capable of being applied to a PDSCH in an active BWP for the scheduled cell and having the lowest ID.

<Spatial Relation for PUCCH>

A parameter (PUCCH configuration information or PUCCH-Config) used for PUCCH transmission may be configured for the UE by higher layer signaling (e.g., Radio Resource Control (RRC) signaling). The PUCCH configuration information may be configured for each partial band (e.g., uplink bandwidth part (BWP)) in a carrier (also referred to as a cell or a component carrier (CC)).

The PUCCH configuration information may include a list of PUCCH resource set information (e.g., PUCCH-ResourceSet) and a list of PUCCH spatial relation information (e.g., PUCCH-SpatialRelationInfo).

The PUCCH resource set information may include a list (e.g., resourceList) of PUCCH resource indices (IDs, for example, PUCCH-ResourceId).

When the UE does not have dedicated PUCCH resource configuration information (e.g., dedicated PUCCH resource configuration) provided by PUCCH resource set information in the PUCCH configuration information (before RRC setup), the UE may determine a PUCCH resource set on the basis of a parameter (e.g., pucch-ResourceCommon) in system information (e.g., System Information Block Type1 (SIB1) or Remaining Minimum System Information (RMSI)). The PUCCH resource set may include 16 pieces of PUCCH resources.

On the other hand, when the UE has the above-described dedicated PUCCH resource configuration information (UE-dedicated uplink control channel configuration or dedicated PUCCH resource configuration) (after RRC set up), the UE may determine the PUCCH resource set in accordance with the number of UCI information bits.

The UE may determine one PUCCH resource (index) in the above-described PUCCH resource set (e.g., a cell-specific or UE-dedicated PUCCH resource set to be determined) on the basis of at least one of a value of a given field (e.g., a PUCCH resource indicator field) in downlink control information (DCI) (e.g., DCI format 1_0 or 1_1 used for scheduling of a PDSCH), the number of CCEs ($N_{CCE}$) in a control resource set (COntrol REsource SET (CORESET)) for PDCCH reception to deliver the DCI, and the leading (first) CCE index ($n_{CCE,0}$) for the PDCCH reception.

The PUCCH spatial relation information (e.g., an RRC information element "PUCCH-spatialRelationInfo") may indicate a plurality of candidate beams (spatial domain filters) for PUCCH transmission. The PUCCH spatial relation information may indicate a spatial relation between an RS (Reference signal) and the PUCCH.

The list of the PUCCH spatial relation information may include some elements (PUCCH spatial relation information IEs (Information Elements)). Each piece of the PUCCH spatial relation information may include, for example, at least one of a PUCCH spatial relation information index (ID, for example, pucch-SpatialRelationInfoId), a serving cell index (ID, for example, servingCellId), and information related to an RS (reference RS) being in a spatial relation with the PUCCH.

For example, the information related to the RS may be an SSB index, a CSI-RS index (e.g., an NZP-CSI-RS resource configuration ID), or an SRS resource ID and BWP ID. The SSB index, the CSI-RS index, and the SRS resource ID may be associated with at least one of a beam, a resource, and a port selected depending on measurement of a corresponding RS.

When more than one pieces of spatial relation information related to the PUCCH are configured, the UE may control, on the basis of a PUCCH spatial relation activation/deactivation MAC CE, so that one piece of PUCCH spatial relation information is active for one PUCCH resource at a given time.

A PUCCH spatial relation activation/deactivation MAC CE of Rel-15 NR is represented by 3 octets (8 bits×3=24 bits) in total of octets (Octs) 1 to 3.

The MAC CE may include information about a serving cell ID ("Serving Cell ID" field), a BWP ID ("BWP ID" field), a PUCCH resource ID ("PUCCH Resource ID" field), or the like being a target for application.

The MAC CE also includes "Si" (i=0 to 7) field. The UE activates spatial relation information with spatial relation information ID #i when a given Si field indicates 1. The UE deactivates the spatial relation information with spatial relation information ID #i when the given Si field indicates 0.

After 3 ms from transmitting a positive acknowledgment (ACK) to a MAC CE to activate given PUCCH spatial relation information, the UE may activate PUCCH relation information designated by the MAC CE.

<Spatial Relation for SRS and PUSCH>

The UE may receive information (SRS configuration information, for example, a parameter in an RRC control element "SRS-Config") used for transmission of a reference signal for measurement (e.g., a sounding reference signal (SRS)).

Specifically, the UE may receive at least one of information related to one or a plurality of SRS resource sets (SRS resource set information, for example, an RRC control element "SRS-ResourceSet") and information related to one or a plurality of SRS resources (SRS resource information, for example, an RRC control element "SRS-Resource").

One SRS resource set may be related to a given number of SRS resources (a given number of SRS resources may be grouped together). Each SRS resource may be identified by an SRS resource indicator (SRI) or an SRS resource ID (Identifier).

The SRS resource set information may include an SRS resource set ID (SRS-ResourceSetId), a list of SRS resource IDs (SRS-ResourceId) used in the resource set, an SRS resource type, or information about SRS usage.

Here, the SRS resource type may indicate any one of a periodic SRS (P-SRS), a semi-persistent SRS (SP-SRS), and an aperiodic SRS (A-SRS or AP-SRS). Note that the UE may periodically (or, after activation, periodically) transmit the P-SRS and SP-SRS, and may transmit the A-SRS on the basis of an SRS request of DCI.

The usage (an RRC parameter "usage" or an L1 (Layer-1) parameter "SRS-SetUse") may be, for example, beam management (beamManagement), codebook-based transmission (codebook (CB)), non-codebook-based transmission (non-Codebook (NCB)), antenna switching (antennaSwitching), or the like. An SRS for codebook-based transmission or non-codebook-based transmission usage may be used for determination of a precoder for codebook-based or non-codebook-based PUSCH transmission based on the SRI.

For example, in a case of codebook-based transmission, the UE may determine the precoder for the PUSCH transmission on the basis of the SRI, a transmitted rank indicator (TRI), and a transmitted precoding matrix indicator (TPMI). In a case of non-codebook-based transmission, the UE may determine the precoder for the PUSCH transmission on the basis of the SRI.

The SRS resource information may include an SRS resource ID (SRS-ResourceId), the number of SRS ports, an SRS port number, a transmission comb, SRS resource mapping (e.g., time and/or frequency resource location, resource offset, resource periodicity, the number of repetitions, the number of SRS symbols, an SRS bandwidth, or the like), hopping-related information, an SRS resource type, a sequence ID, SRS spatial relation information, or the like.

The SRS spatial relation information (e.g., an RRC information element "spatialRelationInfo") may indicate information about a spatial relation between a given reference signal and the SRS. The given reference signal may be at least one of a synchronization signal/broadcast channel (Synchronization Signal/Physical Broadcast Channel (SS/PBCH)) block, a channel state information reference signal (CSI-RS), and an SRS (e.g., another SRS). The SS/PBCH block may be referred to as a synchronization signal block (SSB).

The SRS spatial relation information may include, as an index for the above-described given reference signal, at least one of an SSB index, a CSI-RS resource ID, and an SRS resource ID.

Note that in the present disclosure, an SSB index, an SSB resource ID, and an SSBRI (SSB Resource Indicator) may be interchangeably interpreted. A CSI-RS index, a CSI-RS resource ID, and a CRI (CSI-RS Resource Indicator) may also be interchangeably interpreted. An SRS index, an SRS resource ID, and an SRI may also be interchangeably interpreted.

The SRS spatial relation information may include a serving cell index, a BWP index (BWP ID), or the like corresponding to the above-described given reference signal.

In NR, uplink signal transmission may be controlled on the basis of the presence or absence of beam correspondence (BC). The BC may be, for example, a capability of a given node (e.g., the base station or UE) to determine a beam used for signal transmission (transmit beam or Tx beam) on the basis of a beam used for signal reception (receive beam or Rx beam).

Note that the BC may be referred to as transmit/receive beam correspondence (Tx/Rx beam correspondence), beam reciprocity, beam calibration, calibrated/non-calibrated, reciprocity calibrated/non-calibrated, a correspondence degree, a matching degree, and so on.

For example, when the BC is absent, the UE may transmit an uplink signal (e.g., a PUSCH, a PUCCH, an SRS, or the like) by using a beam (spatial domain transmission filter) identical to that for an SRS (or SRS resource) indicated from the base station on the basis of a measurement result of one or more SRSs (or SRS resources).

On the other hand, when the BC is present, the UE may transmit an uplink signal (e.g., a PUSCH, a PUCCH, an SRS, or the like) by using a beam (spatial domain transmission filter) identical or corresponding to that for a beam (spatial domain reception filter) used for reception of a given SSB or CSI-RS (or CSI-RS resources).

When spatial relation information related to an SSB or CSI-RS, and an SRS is configured with respect to a given SRS resource (e.g., when the BC is present), the UE may transmit the SRS resource by using the same spatial domain filter (spatial domain transmission filter) as a spatial domain filter (spatial domain reception filter) for reception of the SSB or CSI-RS. In this case, the UE may assume that a UE receive beam for the SSB or CSI-RS and a UE transmit beam for the SRS are the same.

With respect to a given SRS (target SRS) resource, when spatial relation information related to another SRS (reference SRS) and the SRS (target SRS) is configured (e.g., when the BC is absent), the UE may transmit the target SRS resource by using the same spatial domain filter (spatial domain transmission filter) as a spatial domain filter (spatial domain transmission filter) for transmission of the reference SRS. That is, in this case, the UE may assume that a UE transmit beam for the reference SRS and a UE transmit beam for the target SRS are the same.

The UE may determine, on the basis of a value of a given field (e.g., an SRS resource indicator (SRI) field) in DCI (e.g., DCI format 0_1), a spatial relation for a PUSCH scheduled by the DCI. Specifically, the UE may use, for PUSCH transmission, spatial relation information (e.g., an RRC information element "spatialRelationInfo") about an SRS resource determined on the basis of the value of the given field (e.g., the SRI).

When codebook-based transmission is used for the PUSCH, two SRS resources may be configured for the UE by RRC, and one of the two SRS resources may be indicated for the UE by DCI (1-bit given field). When non-codebook-based transmission is used for the PUSCH, four SRS resources may be configured for the UE by the RRC, and one of the four SRS resources may be indicated for the UE by DCI (2-bit given field). RRC reconfiguration is necessary for using a spatial relation other than two or four spatial relations configured by the RRC.

Note that a DL-RS is configurable for spatial relations for SRS resources used for the PUSCH. For example, spatial relations for a plurality (e.g., up to 16 pieces) of SRS resources for SP-SRSs are configured for the UE by RRC, and one of the plurality of the SRS resources can be indicated for the UE by a MAC CE.

(Spatial Relation for PUSCH Scheduled by DCI Format 0_0)

DCI format 0_1 includes the SRI, but DCI format 0_0 does not include the SRI.

In Rel. 15 NR, with respect to a PUSCH on a cell scheduled by DCI format 0_0, the UE transmits the PUSCH, if available, in accordance with a spatial relation corresponding to a dedicated PUCCH resource having the lowest ID in an active UL BWP for the cell. The dedicated PUCCH resource may be a PUCCH resource configured in a UE-specific manner (configured by a higher layer parameter PUCCH-Config).

Accordingly, for a cell for which PUCCH resources are not configured (e.g., a secondary cell (SCell)), the PUSCH cannot be scheduled by DCI format 0_0.

When PUCCH on SCell (PUCCH transmitted on the SCell) is not configured, UCI is transmitted on a PCell. When PUCCH on SCell is configured, the UCI is transmitted on a PUCCH-SCell. Accordingly, configuring PUCCH resources and spatial relation information for all SCells is not required, and some cells may be not configured with PUCCH resources.

DCI format 0_1 includes a carrier indicator (carrier indicator field (CIF)), but DCI format 0_0 does not include the CIF. Accordingly, even if PUCCH resources are configured for the PCell, cross-carrier scheduling of the PUSCH on the SCell cannot be performed by DCI format 0_0 on the PCell.

(Default Spatial Relation)

With respect to the UE supporting beam correspondence, when spatial relation information for a dedicated PUCCH configuration or dedicated SRS configuration except SRSs having beam management usage (usage='beamManagement') is not configured in a given frequency range (e.g., frequency range (FR) 2), a default spatial relation may be applied to the dedicated PUCCH configuration or dedicated SRS configuration.

With respect to the UE not supporting beam correspondence, when spatial relation information for a dedicated PUCCH configuration or dedicated SRS configuration except SRSs having beam management usage is not configured in a given frequency range (e.g., FR 2), the default spatial relation may be applied to the dedicated PUCCH configuration or dedicated SRS configuration.

For example, the default spatial relation may be a default TCI state or a default QCL assumption for the PDSCH.

(Beam Failure Recovery)

For NR, performing communication by using beam forming is under study. For example, a UE and base station (e.g., gNodeB (gNB)) may use a beam used for signal transmission (also referred to as a transmit beam, Tx beam, and so on) and a beam used for signal reception (also referred to as a receive beam, Rx beam, and so on).

In a case of using beam forming, the UE and base station are easily affected by disturbance due to an obstruction, and thus deterioration of radio link quality is assumed. Due to deterioration of the radio link quality, radio link failure (RLF) may occur frequently. When the RLF occurs, a cell is required to be reconnected, and thus frequent occurrence of the RLF causes deterioration of system throughput.

For NR, in order to suppress occurrence of the RLF, performing procedure for switching to another beam (which may be referred to as beam recovery (BR), beam failure recovery (BFR), L1/L2 (Layer 1/Layer 2) beam recovery, and so on) when quality of a specific beam deteriorates is under study. Note that the BFR procedure may be simply referred to as BFR.

Note that beam failure (BF) in the present disclosure may be referred to as link failure or radio link failure (RLF).

FIG. 1 is a diagram to show an example of the procedure for beam recovery in Rel. 15 NR. The number of beams and the like are an example, and are not limited to this. In an initial state (step S101) of FIG. 1, the UE performs measurement based on reference signal (RS) resources transmitted with use of two beams.

The RS may be at least one of a synchronization signal block (SSB) and a channel state measurement RS (Channel State Information RS (CSI-RS)). Note that the SSB may be referred to as an SS/PBCH (Physical Broadcast Channel) block and so on.

The RS may be at least one of a primary synchronization signal (Primary SS (PSS)), a secondary synchronization signal (Secondary SS (SSS)), a mobility reference signal (Mobility RS (MRS)), a signal included in the SSB, the SSB, the CSI-RS, a demodulation reference signal (DMRS), a beam-specific signal, and the like, or may be a signal constituted by expanding or changing these signals. The RS measured at step S101 may be referred to as an RS for beam failure detection (Beam Failure Detection RS (BFD-RS)) and so on.

At step S102, due to disturbance of a radio wave from the base station, the UE fails to detect the BFD-RS (or quality of reception of the RS deteriorates). Such disturbance may occur due to, for example, influence of an obstruction, phasing, interference, and the like between the UE and base station.

The UE detects beam failure when a given condition is satisfied. For example, the UE may detect occurrence of the beam failure when a block error rate (BLER) with respect to all of configured BFD-RSs (BFD-RS resource configurations) is less than a threshold. When occurrence of the beam failure is detected, a lower layer (physical (PHY) layer) of the UE may notify (indicate) a higher layer (MAC layer) of a beam failure instance.

Note that standards (criteria) for the judgment are not limited to the BLER, and may be reference signal received power in the physical layer (Layer 1 Reference Signal Received Power (L1-RSRP)). In place of the RS measurement or in addition to the RS measurement, beam failure detection may be performed on the basis of a downlink control channel (Physical Downlink Control Channel (PDCCH)) and the like. The BFD-RS may be expected to be quasi-co-location (QCL) with a DMRS for a PDCCH monitored by the UE.

Here, QCL is an indicator indicating statistical properties of the channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception filter/parameter (Spatial Rx Filter/Parameter) or a spatial transmission filter/parameter (Spatial Tx (transmission) Filter/Parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element of the QCL) in the present disclosure may be interpreted as spatial QCL (sQCL).

Information related to the BFD-RS (e.g., indices, resources, numbers, the number of ports, precoding, and the like for the RS), information related to the beam failure detection (BFD) (e.g., the above-mentioned threshold), and the like may be configured (notified) for the UE with use of higher layer signaling or the like. The information related to the BFD-RS may be referred to as information related to resources for BFR and so on.

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The MAC layer of the UE may start a given timer (which may be referred to as a beam failure detection timer) when receiving beam failure instance notification from the PHY layer of the UE. The MAC layer of the UE may trigger BFR (e.g., start any one of random access procedures mentioned later) when receiving the beam failure instance notification a given number of times (e.g., beamFailureInstanceMaxCount configured by RRC) or more until the timer expires.

When there is no notification from the UE (e.g., time without the notification exceeds given time) or when receiving a given signal (beam recovery request at step S104) from the UE, the base station may judge that the UE has detected beam failure.

At step S103, the UE starts a search for a new candidate beam used for new communication for beam recovery. The UE may select the new candidate beam corresponding to a given RS by measuring the RS. The RS measured at step S103 may be referred to as an RS for new candidate beam identification (New Candidate Beam Identification RS (NCBI-RS)), a CBI-RS, a Candidate Beam RS (CB-RS), and so on. The NCBI-RS may be the same as the BFD-RS, or may be different from the BFD-RS. Note that the new candidate beam may be referred to as a candidate beam or a new beam.

The UE may determine a beam corresponding to an RS satisfying a given condition as the new candidate beam. For example, the UE may determine the new candidate beam on the basis of an RS with an L1-RSRP exceeding a threshold out of configured NCBI-RSs. Note that standards (criteria) for the judgment are not limited to the L1-RSRP. The UE may determine the new candidate beam by using at least one of an L1-RSRP, an L1-RSRQ, and an L1-SINR (signal-to-noise interference power ratio). The L1-RSRP related to an SSB may be referred to as an SS-RSRP. The L1-RSRP related to a CSI-RS may be referred to as a CSI-RSRP. Similarly, the L1-RSRQ related to an SSB may be referred to as an SS-RSRQ. The L1-RSRQ related to a CSI-RS may be referred to as a CSI-RSRQ. Similarly, the L1-SINR related to an SSB may be referred to as an SS-SINR. The L1-SINR related to a CSI-RS may be referred to as a CSI-SINR.

Information related to the NCBI-RS (e.g., resources, numbers, the number of ports, precoding, and the like for the RS), information related to new candidate beam identification (NCBI) (e.g., the above-mentioned threshold), and the like may be configured (notified) for the UE with use of higher layer signaling or the like. The information related to the NCBI-RS may be obtained on the basis of information related to the BFD-RS. The information related to the NCBI-RS may be referred to as information related to resources for NCBI and so on.

Note that the BFD-RS, the NCBI-RS, and the like may be interpreted as a radio link monitoring reference signal (Radio Link Monitoring RS (RLM-RS)).

At step S104, the UE that has identified the new candidate beam transmits a beam recovery request (Beam Failure Recovery reQuest (BFRQ)). The beam recovery request may be referred to as a beam recovery request signal, a beam failure recovery request signal, and so on.

For example, the BFRQ may be transmitted with use of a random access channel (Physical Random Access Channel (PRACH)). The BFRQ may include information about the new candidate beam identified at step S103. Resources for the BFRQ may be associated with the new candidate beam. The information about the beam may be notified with use of a beam index (BI), a port index for a given reference signal, a resource index (e.g., a CSI-RS resource indicator (CRI)), an SSB resource indicator (SSBRI), and the like.

For Rel. 15 NR, CB-BFR (Contention-Based BFR) being BFR based on contention type random access (RA) procedure and CF-BFR (Contention-Free BFR) being BFR based on non-contention type random access procedure are under study. In the CB-BFR and CF-BFR, the UE may transmit a preamble (also referred to as an RA preamble, a random access channel (Physical Random Access Channel (PRACH)), a RACH preamble, and so on) as the BFRQ by using PRACH resources.

At step S105, the base station that has detected the BFRQ transmits a response signal (which may be referred to as BFR response, gNB response, and so on) to the BFRQ from the UE. Reconfiguration information with respect to one or a plurality of beams (e.g., DL-RS resource configuration information) may be included in the response signal.

The response signal may be transmitted in, for example, a UE-common search space for a PDCCH. The response signal may be notified with use of a PDCCH (DCI) having a cyclic redundancy check (CRC) scrambled by an identifier for the UE (e.g., a cell-radio RNTI (C-RNTI)). The UE may judge, on the basis of beam reconfiguration information, at least one of a transmit beam and a receive beam to be used.

The UE may monitor the response signal on the basis of at least one of a control resource set (CORESET) for BFR and a search space set for BFR. For example, the UE may detect the DCI having the CRC scrambled by the C-RNTI in a BFR search space in a separately configured CORESET.

Regarding the CB-BFR, when the UE receives the PDCCH corresponding to the C-RNTI related to the UE itself, it may be judged that contention resolution has succeeded.

With respect to a process at step S105, a period for the UE to monitor response from the base station (e.g., gNB) to the BFRQ may be configured. The period may be referred to as, for example, a gNB response window, a gNB window, a beam recovery request response window, a BFRQ response window, and so on. The UE may perform retransmission of the BFRQ when there is no gNB response detected in the window period.

At step S106, the UE may transmit, to the base station, a message indicating that beam reconfiguration has been completed. For example, the message may be transmitted by a PUCCH, or may be transmitted by a PUSCH.

At step S106, the UE may receive RRC signaling indicating a Transmission Configuration Indication state (TCI state) configuration used for the PDCCH, or may receive a MAC CE indicating activation of the configuration.

Beam recovery success (BR success) may represent, for example, a case where step S106 has been achieved. On the other hand, beam recovery failure (BR failure) may correspond to, for example, the case that BFRQ transmission has reached a given number of times or the case that a beam failure recovery timer (Beam-failure-recovery-Timer) has expired.

Note that numbers for these steps are just numbers for explanation, and a plurality of steps may be organized, or the order of these steps may be changed. Whether BFR is performed may be configured for the UE with use of higher layer signaling.

Incidentally, for future radio communication systems (e.g., Rel. 16 (or later versions)), performing notification of occurrence of beam failure and a report on information related to a cell (or a CC) with the beam failure detected or on information related to a new candidate beam by using an uplink control channel (PUCCH) and a MAC control information (MAC CE) when the beam failure is detected is under study.

Figure 2:
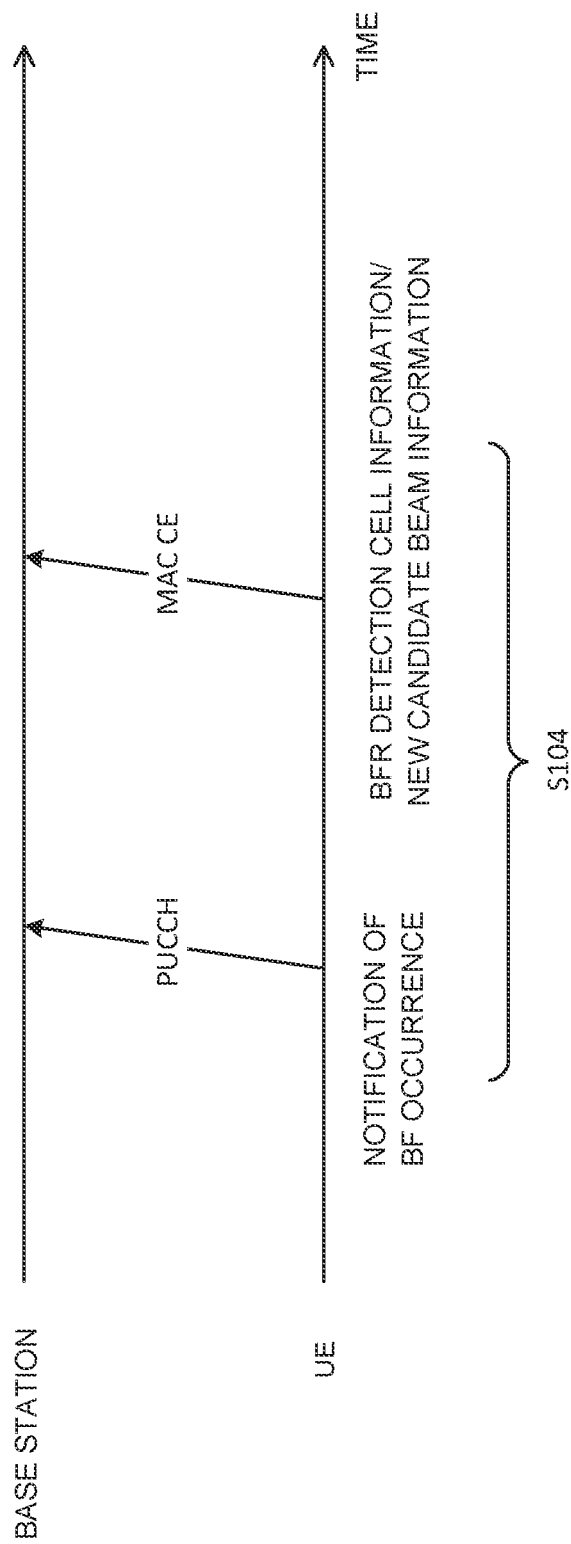
FIG. 2 is a diagram to show an example of new BFR procedure.

For example, it is conceivable that after detecting beam failure, the UE performs notification of occurrence of the beam failure and a report on information related to a cell with the beam failure detected or on information related to a new candidate beam by using one or more steps (e.g., 2 steps) (see FIG. 2). Note that the reporting operation is not limited to the 2 steps.

An uplink control channel is allowed to configure resources more flexibly in time domain as compared to a PRACH. Therefore, using the uplink control channel (PUCCH) as a channel used for BFRQ transmission is effective. A MAC CE (PUSCH) is allowed to configure resources more flexibly in time domain as compared to a PPACH. Therefore, using the MAC CE (PUSCH) as the channel used for BFRQ transmission is also conceivable.

In FIG. 2, the UE notifies occurrence of beam failure by using an uplink control channel (PUCCH) at a first step (or step 1). It is assumed that the UE reports at least one of information related to a cell with the beam failure detected and information related to a new candidate beam by using a MAC control information (e.g., a MAC CE or a MAC PDU including the MAC CE) at a second step (or step 1).

The PUCCH at the first step that uses, for example, a method (dedicated SR-like PUCCH) similar to transmission of a scheduling request (SR) is under study. The MAC CE (or the MAC PDU) at the second step may be transmitted with use of an uplink shared channel (PUSCH).

In the present disclosure, the MAC CE (or the MAC PDU) at the second step, a step 2 MAC CE, and a report of a candidate. In the present disclosure, the new candidate beam, a new beam, and a candidate beam may be interchangeably interpreted. The response signal (S107), response to the step 2 MAC CE, and response to the report of the candidate beam may be interchangeably interpreted.

However, how the new candidate beams are applied has not been fully studied. For example, when BFR procedure for an SCell is performed, how a spatial relation for the SCell is applied is indefinite. Unless the spatial relation is applied appropriately, system performance degradation, such as throughput reduction, may occur.

Thus, the inventors of the present invention came up with the idea of a method for performing BFR procedure appropriately.

Hereinafter, embodiments according to the present disclosure will be described in detail with reference to the drawings. The radio communication methods according to respective embodiments may each be employed individually, or may be employed in combination.

In the present disclosure, a cell, a CC, a carrier, a BWP, and a band may be interchangeably interpreted.

In the present disclosure, an index, an ID, an indicator, and a resource ID may be interchangeably interpreted.

In the present disclosure, specific UL transmission, a specific UL signal, a UL signal of a specific type, a specific UL channel, a PUSCH, a PUCCH, an SRS, a P-SRS, an SP-SRS, and an A-SRS may be interchangeably interpreted. In the present disclosure, a specific DL signal, a specific DL resource, a DL signal of a specific type, specific DL reception, a specific DL channel, a PDSCH, a PDCCH, a CORESET, a DL-RS, an SSB, and a CSI-RS may be interchangeably interpreted.

A TCI state, a TCI state or QCL assumption, a QCL assumption, a QCL parameter, a spatial domain reception filter, a UE spatial domain reception filter, a spatial domain filter, a UE receive beam, a DL receive beam, DL precoding, a DL precoder, a DL-RS, an RS of QCL type D with a TCI state or QCL assumption, and an RS of QCL type A with a TCI state or QCL assumption may be interchangeably interpreted. The RS of QCL type D, a DL-RS associated with QCL type D, a DL-RS having QCL type D, a DL-RS source, an SSB, and a CSI-RS may be interchangeably interpreted.

In the present disclosure, the TCI state may be information (e.g., a DL-RS, a QCL type, a cell in which the DL-RS is transmitted, or the like) related to a receive beam (spatial domain reception filter) indicated (configured) for the UE. The QCL assumption may be information (e.g., a DL-RS, a QCL type, a cell in which the DL-RS is transmitted, or the like) related to a receive beam (spatial domain reception filter) assumed by the UE on the basis of transmission or reception of an associated signal (e.g., a PRACH).

In the present disclosure, the latest slot, the most recent slot, the latest search space, and the most recent search space may be interchangeably interpreted.

In the present disclosure, a spatial relation, spatial relation information, a spatial relation assumption, a QCL parameter, a spatial domain transmission filter, a UE spatial domain transmission filter, a spatial domain filter, a UE transmit beam, a UL transmit beam, UL precoding, a UL precoder, an RS with a spatial relation, a DL-RS, a QCL assumption, an SRI, a spatial relation based on the SRI, and a UL TCI may be interchangeably interpreted.

In the present disclosure, the default spatial relation, a default spatial relation assumption, an RS for QCL of a specific DL resource, a TCI state or QCL assumption for the specific DL resource, a TCI state or QCL assumption for the specific DL signal, an RS related to a QCL parameter given by the TCI state or QCL assumption for the specific DL signal, an RS of QCL type D in the TCI state or QCL assumption for the specific DL signal, and a spatial relation for reference UL transmission may be interchangeably interpreted.

In the present disclosure, "the UE transmits the specific UL transmission in accordance with the default spatial relation," "the UE uses the default spatial relation for a spatial relation for the specific UL transmission," "the UE assumes (regards) that the spatial relation for the specific UL transmission is identical to an RS with the default spatial relation," and "the UE assumes (regards) that the spatial relation for the specific UL transmission is identical to an RS of QCL type D with the default spatial relation" may be interchangeably interpreted.

In the present disclosure, the TRS, a CSI-RS for tracking, a CSI-RS having TRS information (higher layer parameter trs-Info), and NZP-CSI-RS resources in an NZP-CSI-RS resource set having the TRS information may be interchangeably interpreted.

In the present disclosure, DCI format 0_0, DCI not including an SRI, DCI not including an indication of a spatial relation, and DCI not including a CIF may be interchangeably interpreted. In the present disclosure, DCI format 0_1, DCI including an SRI, DCI including an indication of a spatial relation, and DCI including a CIF may be interchangeably interpreted.

In the present disclosure, the path loss reference RS, an RS for path loss reference, an RS for path loss estimation, an RS for path loss calculation, a pathloss (PL)-RS, index $q_d$, an RS used for path loss calculation, an RS resource used for path loss calculation, and a calculation RS may be interchangeably interpreted. Calculation, estimation, and measurement may be interchangeably interpreted.

(Radio Communication Method)
<Condition for Application of Default Spatial Relation>

When a condition for application of the default spatial relation is satisfied, the UE may apply the default spatial relation to a spatial relation for a specific UL transmission. The specific UL transmission may be at least one of a PUSCH, a PUCCH, an SRS, a P-SRS, an SP-SRS, and an A-SRS.

The condition for application of the default spatial relation may include at least one of a case that spatial relation information for the specific UL transmission is not configured, a case that the specific UL transmission is in a frequency range (e.g., frequency range (FR) 2), a case that the specific UL transmission is based on a dedicated PUCCH configuration or dedicated SRS configuration except an SRS having beam management usage (usage='beamManagement') and an SRS having usage of non-codebook-based transmission (usage='nonCodebook') having a configuration of an associated CSI-RS (associatedCSI-RS), and a case that the UE supports beam correspondence. The spatial relation information for the specific UL transmission may be spatial relation information in the dedicated PUCCH configuration or dedicated SRS configuration. The associated CSI-RS may be an ID (index) for a CSI-RS resource associated with an SRS resource set in non-codebook-based transmission.

The condition for application of the default spatial relation may include a case that a path loss reference RS is not configured for the specific UL transmission. The condition for application of the default spatial relation may include a case that the path loss reference RS is not configured by higher layer signaling for the specific UL transmission.

The condition for application of the default spatial relation may include the case that only one TCI state is active for a PDCCH (a case that the number of active TCI states for the PDCCH is 1). According to this condition for application of the default spatial relation, a simple UE operation is achieved.

The condition for application of the default spatial relation may include the case that only one TCI state is active for a PDCCH and PDSCH (a case that the number of active TCI states for the PDCCH and PDSCH is 1). In a case where a single active beam is used for UL and DL, the simple UE operation is achieved.

The condition for application of the default spatial relation may include a case that a PDCCH and a PUCCH scheduled by the PDCCH are in the same BWP or the same CC (a case that cross-carrier scheduling is not used). In a case of the cross-carrier scheduling, the UE may not always be able to apply the same beam to the PDCCH and PUCCH, and thus the simple UE operation is achieved by removing the cross-carrier scheduling. For example, in a case of inter-band carrier aggregation (CA), it is conceivable that different beams are applied to the PDCCH and PUCCH. For example, in a case of FR 1-FR 2 CA, it is conceivable that the UE cannot determine the beam when DCI is in FR 1 and a PUCCH, an SRS, or a PUSCH is in FR 2.

The condition for application of the default spatial relation may include a case that the inter-band CA is not used.

The condition for application of the default spatial relation may include a case that an SRI for specific UL transmission PUSCH is absent. The condition for application of the default spatial relation may include a case that an SRS resource corresponding to the SRI for the PUSCH is absent.

<Default Spatial Relation>

The default spatial relation may be an RS for QCL of the specific DL resource.

The RS for QCL of the specific DL resource, the default TCI state or default QCL assumption for the specific DL resource, a TCI state for a CORESET having the lowest CORESET-ID in the most recent slot, an RS related to a QCL parameter used for PDCCH QCL indication of a CORESET having the lowest CORESET-ID in the latest slot in which one or more CORESETs in an active BWP for the serving cell are monitored by the UE, the CORESET being associated with a search space to be monitored, a TCI state or QCL assumption for a CORESET having the lowest CORESET-ID in the latest slot and associated with a search space to be monitored, a TCI state or QCL assumption for a CORESET having the lowest CORESET-ID in a specific slot and associated with a search space to be monitored, a TCI state or QCL assumption for a specific CORESET, a TCI state or QCL assumption for a DL signal corresponding to the specific UL transmission (e.g., a DL channel to trigger the specific UL transmission, a DL channel to schedule the specific UL transmission, or a DL channel to schedule a DL channel corresponding to the specific UL transmission), an RS related to a QCL parameter for the specific DL resource, and an RS for QCL for the specific DL resource may be interchangeably interpreted.

An RS with the default spatial relation, default TCI state, or default QCL assumption may be an RS of QCL type D or an RS of QCL type A, may be, if applicable, an RS of QCL type D, or may be an RS of QCL type A.

The latest slot may be the latest slot for the specific DL resource. The latest slot may be the latest slot for a start symbol for the specific UL transmission (or before the symbol). The latest slot may be the latest slot for the first or last symbol of a DL signal corresponding to the specific UL transmission (before the symbol). For example, when the specific UL transmission is a PUCCH, the DL signal corresponding to the specific UL transmission may be a PDSCH corresponding to the PUCCH (PDSCH corresponding to HARQ-ACK delivered on the PUCCH).

The specific UL transmission may be a PUSCH scheduled by DCI format 0_0. For example, the specific UL transmission may be a PUSCH on a cell in a case where a PUCCH resource (e.g., a dedicated PUCCH resource) having a spatial relation (e.g., an active spatial relation) in an active UL BWP for the cell is not configured, the PUSCH being scheduled by DCI format 0_0.

The default spatial relation may be any one of the following default spatial relations 1 to 5.

<<Default Spatial Relation 1>>

The default spatial relation may be a default TCI state or a default QCL assumption for the PDSCH.

The default spatial relation may be a default TCI state for the PDSCH or a default QCL assumption for the PDSCH. When a CORESET is configured on a CC to which the default spatial relation is applied, the default TCI state for the PDSCH or the default QCL assumption for the PDSCH may be a TCI state corresponding to the lowest CORESET ID for the most recent (latest) slot or the most recent search space. When any CORESETs are not configured on the CC to which the default spatial relation is applied, the default TCI state for the PDSCH or the default QCL assumption for the PDSCH may be an activated TCI state capable of being applied to a PDSCH in an active DL BWP for the CC and having the lowest ID.

The specific DL resource may be a PDSCH.

<<Default Spatial Relation 2>>

The default spatial relation may be one of active TCI states (activated TCI states) for the CORESET.

A plurality of TCI states may be active for the CORESET. In this case, an active TCI state selected as the default spatial relation may be a default RS, or may be a default TCI state or a default QCL assumption.

The specific DL resource may be a PDCCH.

<<Default Spatial Relation 3>>

When the specific UL transmission corresponds to a PDCCH (when the specific UL transmission is scheduled or triggered by a PDCCH (DL DCI) for PDSCH scheduling), the default spatial relation for the specific UL transmission may be a TCI state for the PDCCH. The specific UL transmission may be an A-SRS triggered by the PDCCH, or may be a PUCCH to deliver HARQ-ACK for a PDSCH scheduled by the PDCCH. For example, when the specific UL transmission is an A-SRS, the PDCCH corresponding to the specific UL transmission may be a PDCCH to trigger the A-SRS. For example, when the specific UL transmission is a PUCCH to deliver HARQ-ACK, the PDCCH corresponding to the specific UL transmission may be a PDCCH to schedule a PDSCH and to indicate an HARQ-ACK timing for the PDSCH. When the specific UL transmission does not correspond to the PDCCH, the default spatial relation may be the above-mentioned default spatial relation 1.

The specific DL resource may be a PDCCH or PDSCH.

<<Default Spatial Relation 4>>

The default spatial relation may be a QCL assumption for CORESET #0 (CORESET having an ID with 0).

The specific DL resource may be CORESET #0.

<<Default Spatial Relation 5>>

The default spatial relation may be a path loss reference RS.

The default spatial relation may be an RS used for path loss calculation. The RS used for path loss calculation, an RS resource used for path loss calculation, and a calculation RS may be interchangeably interpreted. The calculation RS may be an RS resource obtained from an SS/PBCH block used by the UE for acquiring an MIB. For example, the calculation RS may be the path loss reference RS. For example, when path loss reference RS information (path-lossReferenceRSs) for the specific UL transmission is not given or when a dedicated higher layer parameter is not given to the UE, the calculation RS may be an RS resource obtained from an SS/PBCH block used by the UE for acquiring an MIB. The calculation RS may be a path loss reference RS having index 0 in path loss reference RS information (path loss reference RS list). For example, when path loss reference RS information (pathlossReferenceRSs in PUCCH power control information (PUCCH-PowerControl)) is given to the UE and PUCCH spatial relation information (PUCCH-SpatialRelationInfo) is not given to the UE, the calculation RS may be a reference signal (referencesignal) in a path loss reference RS for the PUCCH from a path loss reference RS-ID for the PUCCH (PUCCH-PathlossReferenceRS-Id) having index 0 in path loss reference RS information for the PUCCH (PUCCH-PathlossReferenceRS).

When a path loss reference RS for the specific UL transmission is not configured by higher layer signaling, the UE may use the calculation RS for the default spatial relation for the specific UL transmission.

When the path loss reference RS for the specific UL transmission is configured by the higher layer signaling, the UE may use a configured path loss reference RS for the default spatial relation for the specific UL transmission.

The specific DL resource may be a path loss reference RS.

<SCell BFR>

A UE operation in a case where beam failure in an SCell is detected and the UE transmits a step 2 MAC CE related to the beam failure to receive a response to the step 2 MAC CE will be described.

In the present disclosure, a secondary cell, an SCell, a cell in which a PUCCH is not transmitted (configured), and a CC in which a PUCCH is not transmitted (configured) may be interchangeably interpreted.

When the default spatial relation is not applied, the UE may, after a lapse of application time from reception of a response to the step 2 MAC CE, apply a new beam indicated by the step 2 MAC CE to UL transmission associated with an SCell in which beam failure has been detected. For example, when the default spatial relation is not applied to the specific UL transmission, the UE may, after a lapse of the application time from reception of a response to the step 2 MAC CE, apply the new beam indicated by the step 2 MAC CE to specific UL transmission associated with the SCell in which beam failure has been detected.

The specific UL transmission may be at least one of a PUSCH, PUCCH, and SRS, may be a PUSCH and PUCCH, may be a PUCCH or SRS, may be UL transmission based on a dedicated PUCCH configuration or dedicated SRS configuration, may be all PUCCH resources in a PUCCH cell group including the SCell in which beam failure has been detected, or may be all PUSCHs or all SRSs in the same frequency band including the SCell in which beam failure has been detected.

A case that the default spatial relation is applied and a case that the condition for application of the default spatial relation is satisfied may be interchangeably interpreted. A case that the default spatial relation is not applied, a case that the condition for application of the default spatial relation is not satisfied, a case that a condition for non-application is satisfied, and a case that an RS for QCL of the specific DL resource is not applied may be interchangeably interpreted.

The condition for non-application may include at least one of a case that a spatial relation (spatial relation information) is configured for specific UL transmission in an active BWP, active CC, or SCell in which beam failure has been detected, a case that a spatial relation (spatial relation information) is configured for specific UL transmission, a case that a PUCCH resource is configured for the active BWP or active CC and specific UL transmission (e.g., a PUSCH) is scheduled by DCI format 0_1, a case that a PUCCH resource including spatial relation information is configured for the active BWP or active CC and specific UL transmission (e.g., a PUSCH) is scheduled by DCI format 0_1, a case that a PUCCH resource is configured for a cell or BWP for specific UL transmission (e.g., a PUSCH) and the specific UL transmission is scheduled by DCI format 0_1, a case that specific UL transmission (e.g., a PUSCH) is scheduled by DCI format 0_1, a case that a CC for the specific UL transmission or BWP for the specific UL transmission has a PUCCH resource configuration, a case that spatial relation information associated with the specific UL transmission is configured, and a case that a PUCCH resource associated with the specific UL transmission is configured.

The PUCCH resource associated with the specific UL transmission, a PUCCH resource on the CC for the specific UL transmission or BWP for the specific UL transmission, a PUCCH resource for the active BWP or active CC, and a PUCCH resource including spatial relation information for the active BWP or active CC may be interchangeably interpreted.

The application time may be defined by specifications, or may be configured by higher layer signaling. The application time may be represented by the number of symbols, may be represented by the number of symbols for each piece of subcarrier spacing, or may be represented by time (e.g., unit of μs). For example, the application time may be K symbols.

<<Spatial Relation>>

Figure 3:
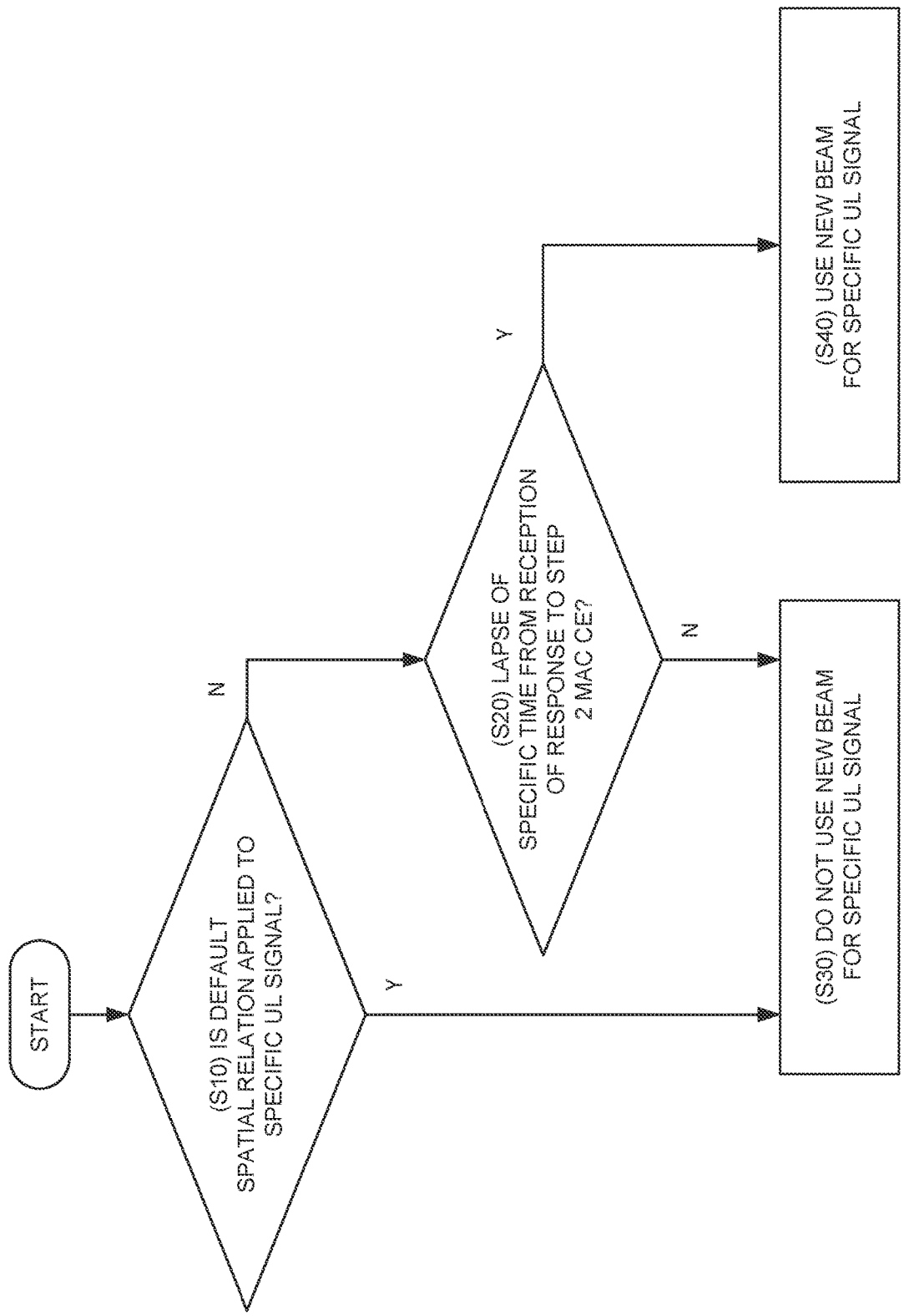
FIG. 3 is a diagram to show an example of a method for judging application of a new beam.

When the default spatial relation is not applied, the UE may, after a lapse of the application time from reception of a response to the step 2 MAC CE, apply the new beam indicated by the step 2 MAC CE to at least UL transmission on an SCell in which beam failure has been detected. For example, as shown in FIG. 3, when the default spatial relation is not applied to the specific UL transmission (S10: N), the UE may, after a lapse of the application time from reception of a response to the step 2 MAC CE (S20: Y), apply the new beam indicated by the step 2 MAC CE to at least specific UL transmission on the SCell in which beam failure has been detected (S40).

For example, when the default spatial relation is not applied to the specific UL transmission (S10: N), the UE may not, until a lapse of the application time from reception of a response to the step 2 MAC CE (S20: N), apply the new beam indicated by the step 2 MAC CE to at least the specific UL transmission on the SCell in which beam failure has been detected (S30). For example, when the default spatial relation is applied to the specific UL transmission (S10: Y), the UE may not apply the new beam indicated by the step 2 MAC CE to at least the specific UL transmission on the SCell in which beam failure has been detected (S30).

<<PUCCH>>

When the specific UL transmission is a PUCCH, the UE transmits the PUCCH in a PCell or PUCCH-SCell, and thus it is conceivable that the new beam is not applied to the PUCCH even when the new beam is applied to only the SCell in which beam failure is detected. Thus, the UE may apply the new beam to all PUCCH resources (PUCCH using all PUCCH resources) in a PUCCH cell group including the SCell in which beam failure has been detected.

When the default spatial relation is not applied, the UE may, after a lapse of the application time from reception of a response to the step 2 MAC CE, apply the new beam indicated by the step 2 MAC CE to at least all PUCCH resources in the PUCCH cell group including the SCell in which beam failure has been detected. For example, when the default spatial relation is not applied to the specific UL transmission, the UE may, after a lapse of the application time from reception of a response to the step 2 MAC CE, apply the new beam indicated by the step 2 MAC CE to at least all PUCCH resources in the PUCCH cell group including the SCell in which beam failure has been detected.

<<PUSCH/SRS>>

When the specific UL transmission is a PUSCH or SRS, it is conceivable that the UE fails to perform simultaneous UL transmission in a plurality of CCs when applying the new beam to only the SCell in which beam failure has been detected. Thus, the UE may apply the new beam to all specific UL transmission in the same band. The specific UL transmission may be at least one of the PUSCH and SRS.

When the default spatial relation is not applied, the UE may, after a lapse of the application time from reception of a response to the step 2 MAC CE, apply the new beam indicated by the step 2 MAC CE to at least all specific UL transmission in the same frequency band including the SCell in which beam failure has been detected. For example, when the default spatial relation is not applied to the specific UL transmission, the UE may, after a lapse of the application time from reception of a response to the step 2 MAC CE, apply the new beam indicated by the step 2 MAC CE to at least all the specific UL transmission in the same frequency band including the SCell in which beam failure has been detected.

<<TCI State>>

When the default spatial relation is not applied, the UE may, after a lapse of TCI application time from reception of a response to the step 2 MAC CE, apply the new beam indicated by the step 2 MAC CE to a TCI state (e.g., DL reception, a PDCCH, or a PDSCH) on the SCell in which beam failure has been detected.

The TCI application time may be defined by specifications, or may be configured by higher layer signaling. The TCI application time may be represented by the number of symbols, may be represented by the number of symbols for each piece of subcarrier spacing, or may be represented by time (e.g., unit of μs). The TCI application time may be the same as the application time, or may be different from the application time. For example, the TCI application time may be K' symbols. K' may be the same as K, or may be different from K.

<<Case where Default Spatial Relation is Applied>>

When the default spatial relation is applied, the UE may, even after a lapse of the application time from reception of a response to the step 2 MAC CE, apply the default spatial relation to UL transmission on the SCell in which beam failure has been detected. For example, when the default spatial relation is applied to the specific UL transmission, the UE may, even after a lapse of the application time from reception of a response to the step 2 MAC CE, apply the default spatial relation to specific UL transmission on the SCell in which beam failure has been detected.

After reception of a response to the step 2 MAC CE or after a lapse of the application time from reception of a response to the step 2 MAC CE, when the default spatial relation for the specific UL transmission is a TCI state for the specific DL resource and the TCI state is updated, the UE may update the default spatial relation for the specific UL transmission to the TCI state (the updated TCI state may be applied to the specific UL transmission).

According to the embodiments above, the UE can appropriately determine a transmit beam (spatial relation) for the specific UL transmission, and the base station can appropriately determine a receive beam for the specific UL transmission.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 4:
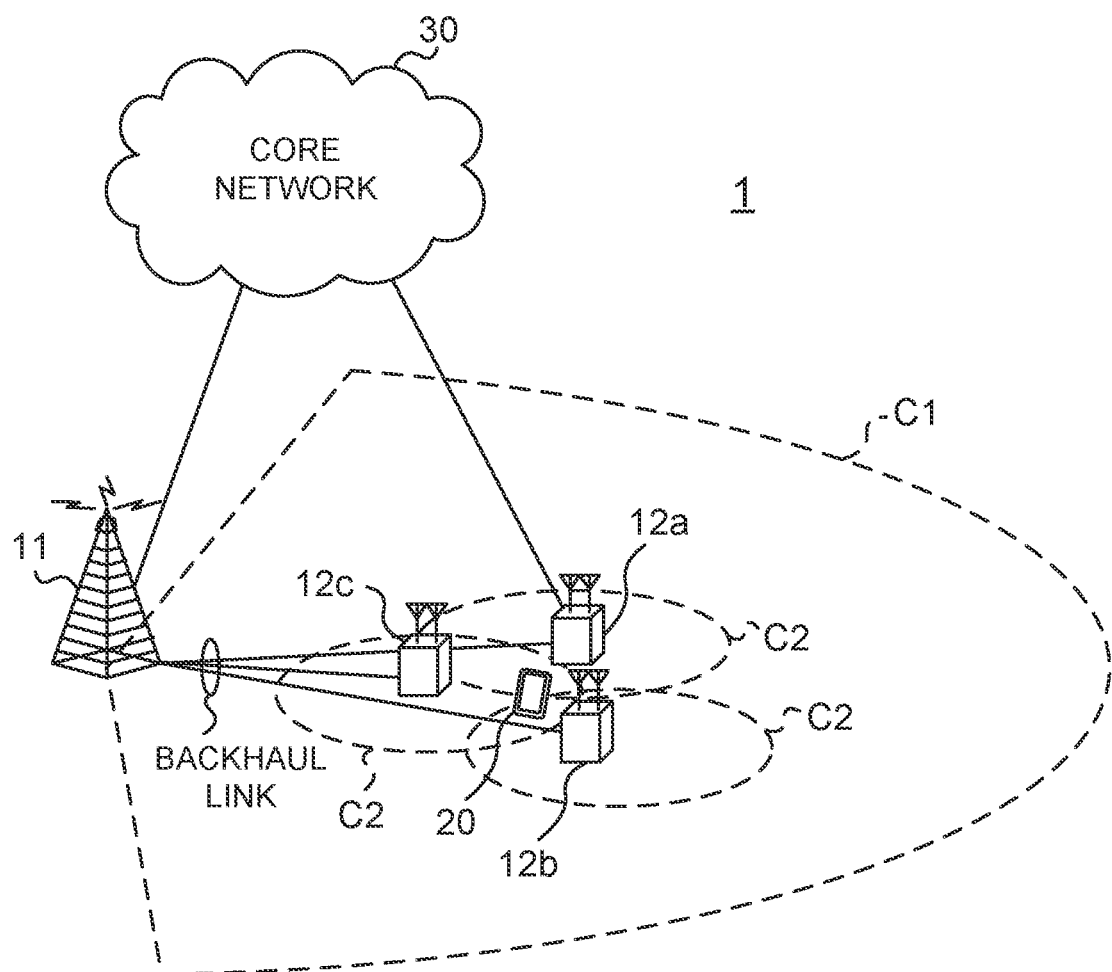
FIG. 4 is a diagram to show an example of a schematic structure of a radio communication system according to one embodiment.

FIG. 4 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 5:
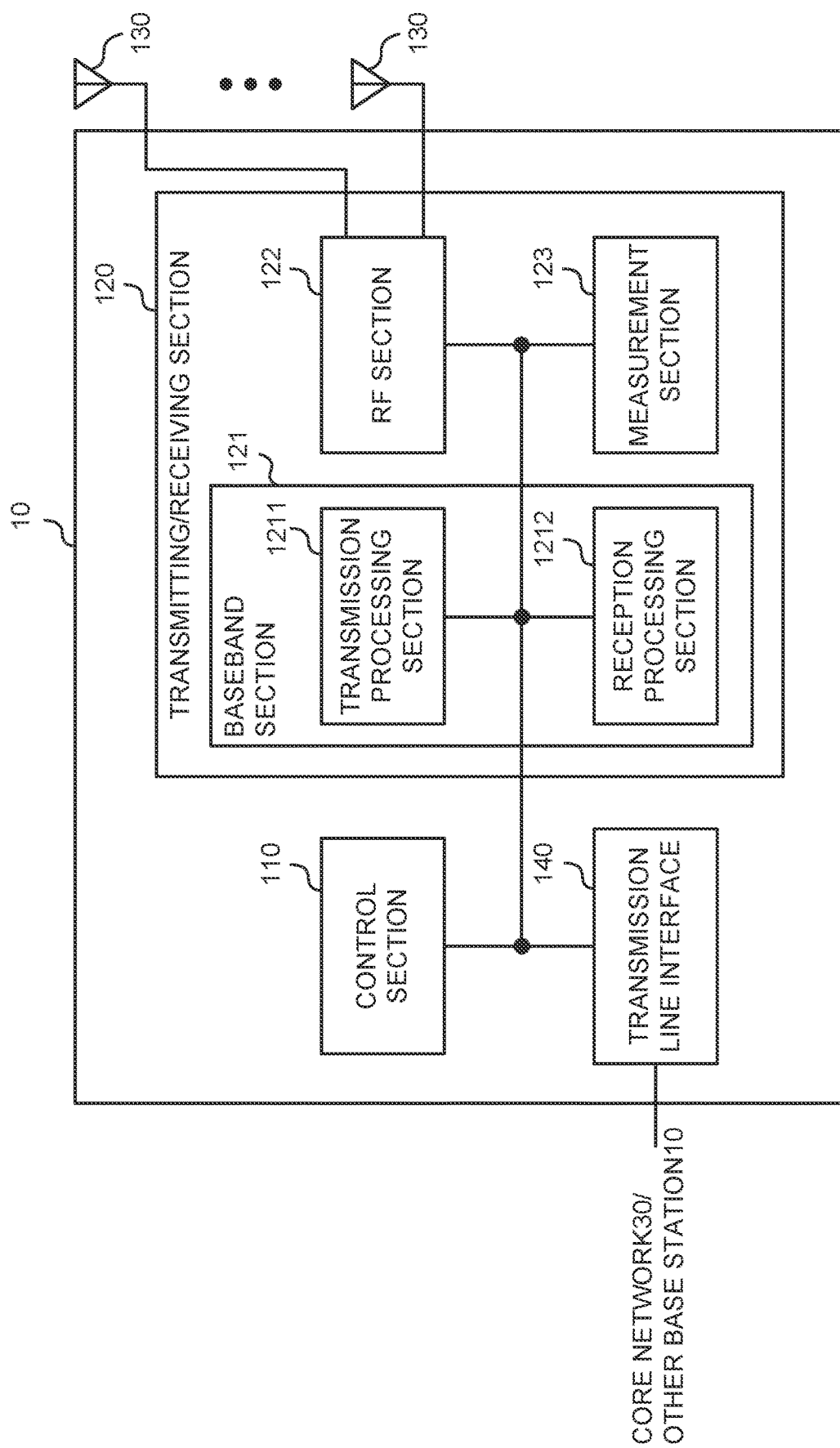
FIG. 5 is a diagram to show an example of a structure of a base station according to one embodiment.

FIG. 5 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

(User Terminal)

Figure 6:
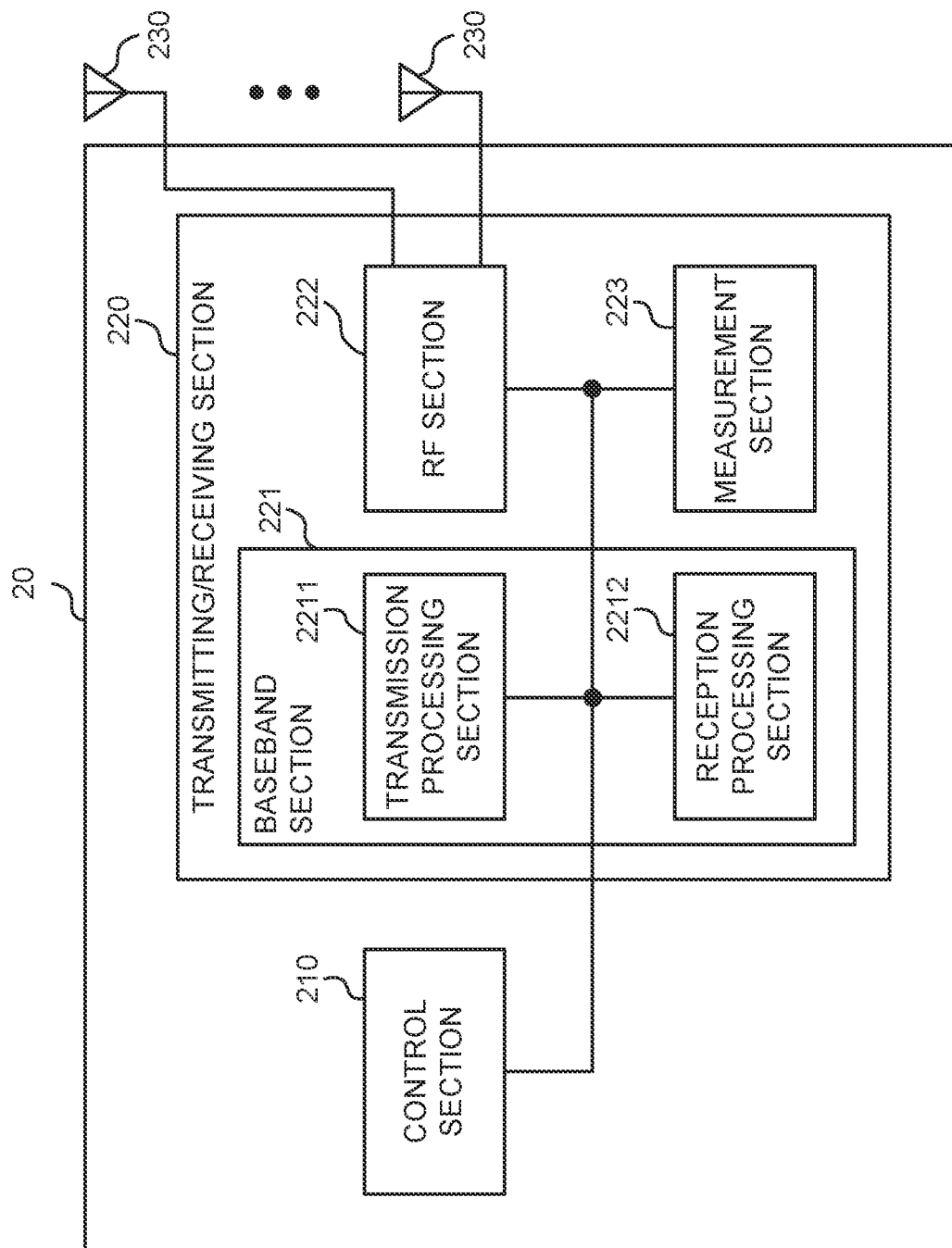
FIG. 6 is a diagram to show an example of a structure of a user terminal according to one embodiment.

FIG. 6 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a response to a report of a candidate beam for beam failure in a secondary cell. When a reference signal for quasi co-location (QCL) of a specific downlink resource is not applied to uplink transmission associated with the secondary cell and time from the response to the uplink transmission is longer than specific time, the control section 210 may apply the candidate beam to the uplink transmission.

The uplink transmission may be transmitted on the secondary cell.

The uplink transmission may use all PUCCH resources in a physical downlink control channel (PUCCH) cell group including the secondary cell.

The uplink transmission may be all physical downlink shared channels and all sounding reference signals in a frequency band including the secondary cell.

When spatial relation information for the uplink transmission is configured or when a PUCCH resource associated with the uplink transmission is configured, the reference signal for QCL of the specific downlink resource may not be applied to the uplink transmission.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 7:
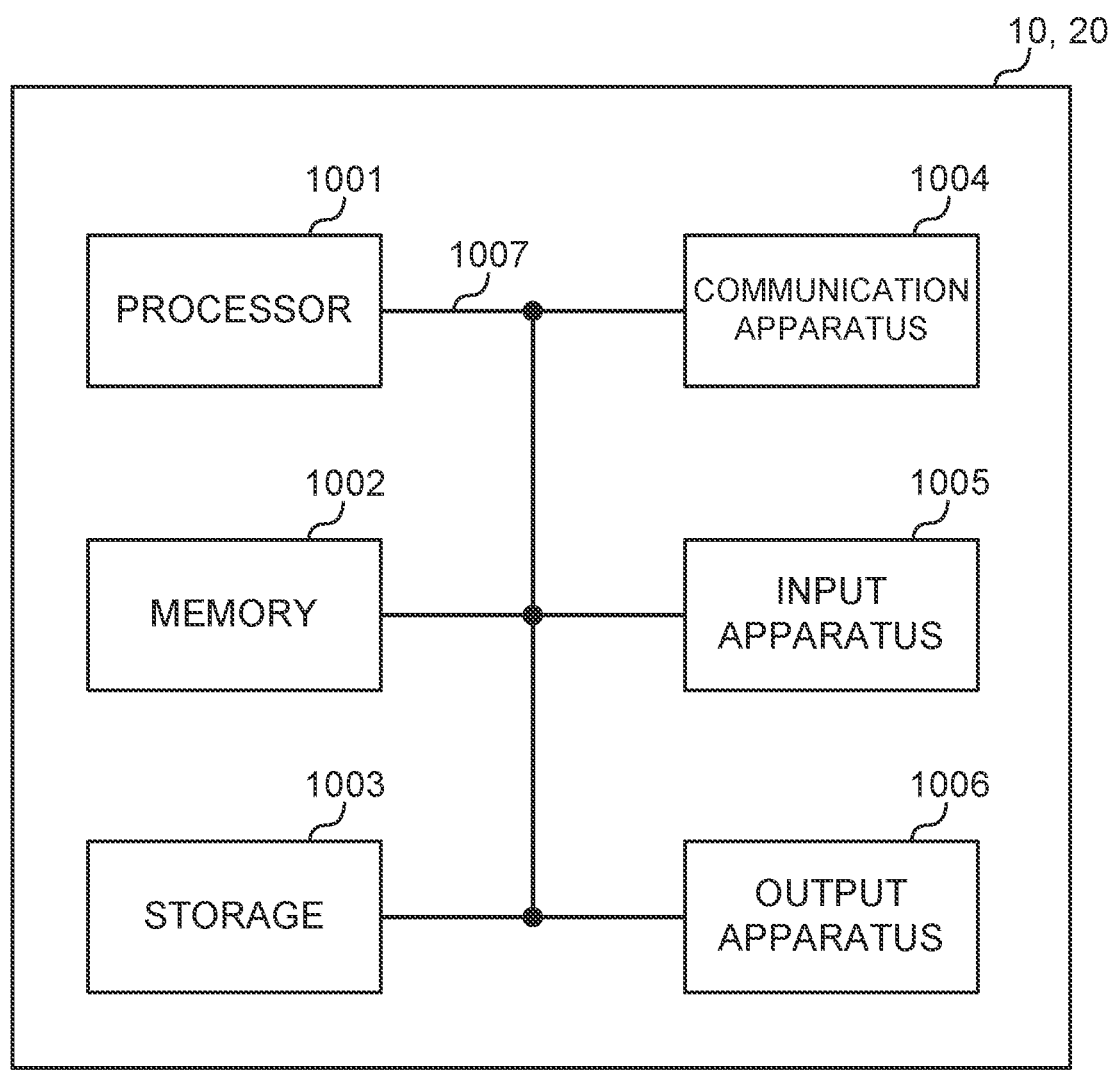
FIG. 7 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 7 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

This application is based on Japanese Patent Application No. 2019-191063 filed on Oct. 18, 2019. The entire contents of the application are herein incorporated.

What is claimed is:

1. A terminal comprising:
a receiver that receives a response to a report of a candidate beam for beam failure in a secondary cell; and
a processor that, when spatial relation information for a physical uplink control channel (PUCCH) transmission which is associated with the secondary cell is configured and time between the response to the report of the candidate beam for the beam failure and the PUCCH transmission is longer than a given time which is represented by a number of symbols, as K symbols, applies the candidate beam to the PUCCH transmission,
wherein the processor, when transmission configuration indication (TCI) state is configured, applies, after the given time from the response to the report of the candidate beam for the beam failure, the candidate beam to a downlink (DL) reception.

2. The terminal according to claim 1, wherein the PUCCH transmission is transmitted on the secondary cell.

3. A radio communication method for a terminal comprising:
receiving a response to a report of a candidate beam for beam failure in a secondary cell;
when spatial relation information for a physical uplink control channel (PUCCH) transmission which is associated with the secondary cell is configured and time between the response to the report of the candidate beam for the beam failure and the PUCCH transmission is longer than a given time which is represented by a number of symbols, as K symbols, applying the candidate beam to the PUCCH transmission; and
when transmission configuration indication (TCI) state is configured, applying, after the given time from the response to the report of the candidate beam for the beam failure, the candidate beam to a downlink (DL) reception.

4. A base station comprising:
a transmitter that transmits a response to a report of a candidate beam for beam failure in a secondary cell; and
a processor that, when spatial relation information for a physical uplink control channel (PUCCH) transmission which is associated with the secondary cell is configured and time between the response to the report of the candidate beam for the beam failure and the PUCCH transmission is longer than a given time which is represented by a number of symbols, as K symbols, determines that the candidate beam is applied to the PUCCH transmission, wherein the processor, when transmission configuration indication (TCI) state is configured, determines that, after the given time from the response to the report of the candidate beam for the beam failure, the candidate beam is applied to a downlink (DL) reception.

5. A system comprising a terminal and a base station, wherein the terminal comprises:
 a receiver that receives a response to a report of a candidate beam for beam failure in a secondary cell; and
 a processor of the terminal that, when spatial relation information for a physical uplink control channel (PUCCH) transmission which is associated with the secondary cell is configured and time between the response to the report of the candidate beam for the beam failure and the PUCCH transmission is longer than a given time which is represented by a number of symbols, as K symbols, applies the candidate beam to the PUCCH transmission, wherein the processor of the terminal, when transmission configuration indication (TCI) state is configured, applies, after the given time from the response to the report of the candidate beam for the beam failure, the candidate beam to a downlink (DL) reception, and the base station comprises:
 a transmitter that transmits the response to the report of the candidate beam for the beam failure; and
 a processor of the base station that, when the spatial relation information for the PUCCH transmission is configured and the time between the response to the report of the candidate beam for the beam failure and the PUCCH transmission is longer than the given time, determines that the candidate beam is applied to the PUCCH transmission, wherein the processor of the base station, when the TCI state is configured, determines that, after the given time from the response to the report of the candidate beam for the beam failure, the candidate beam is applied to the DL reception.

* * * * *